us009683627B2

(12) United States Patent
Boulet et al.

(10) Patent No.: US 9,683,627 B2
(45) Date of Patent: Jun. 20, 2017

(54) MECHANISM FOR FILTERING TORQUE FLUCTUATIONS OF SECONDARY MEMBER

(71) Applicant: VALEO EMBRAYAGES, Amiens (FR)

(72) Inventors: Jerome Boulet, Oroer (FR); Benoit Fleche, Chantilly (FR); Daniel Fenioux, Saleux (FR); Franck Cailleret, Amiens (FR); Carsten Lauridsen, Mesnil le Theribus (FR); Roel Verhoog, Gournay sur Aronde (FR); Olivier Marechal, Amiens (FR); Herve Mahe, Salouel (FR)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 15/032,575

(22) PCT Filed: Oct. 31, 2014

(86) PCT No.: PCT/FR2014/052779
§ 371 (c)(1),
(2) Date: Apr. 27, 2016

(87) PCT Pub. No.: WO2015/063430
PCT Pub. Date: May 7, 2015

(65) Prior Publication Data
US 2016/0252156 A1     Sep. 1, 2016

(30) Foreign Application Priority Data

Oct. 31, 2013    (FR) ........................................ 13 60749
May 12, 2014    (FR) ........................................ 14 54219

(51) Int. Cl.
*F16D 23/00*      (2006.01)
*F16F 15/131*     (2006.01)
(Continued)

(52) U.S. Cl.
CPC .......... *F16F 15/13128* (2013.01); *F16D 3/12* (2013.01); *F16F 15/13157* (2013.01); *F16H 45/02* (2013.01); *F16H 2045/0226* (2013.01)

(58) Field of Classification Search
CPC . F16F 15/13128; F16F 15/13157; F16D 3/12; F16H 2045/0226; F16H 45/02
See application file for complete search history.

(56) References Cited

U.S. PATENT DOCUMENTS 4,751,992 A      6/1988   Maucher et al.
5,848,938 A *   12/1998   Curtis ................... F16F 15/137
                                                       192/212

(Continued)

FOREIGN PATENT DOCUMENTS

CN         101360929 A      2/2009
CN         103375531 A     10/2013
(Continued)

OTHER PUBLICATIONS

Corresponding ISR for PCT/FR2014/052779.

*Primary Examiner* — David J Hlavka
(74) *Attorney, Agent, or Firm* — Berenato & White, LLC

(57) ABSTRACT

A filtering mechanism for torque fluctuations is interposed between a crankshaft of an internal combustion engine and a transmission. This mechanism comprises a rotating member to be damped, an oscillating inertial flywheel rotating around the axis of revolution, and pivot-mounted modules allowing angular deflection of the oscillating inertial flywheel with respect to the member to be damped. The modules each have at least one oscillating arm pivoting radially with respect to the member to be damped and a kinematic connecting member between the oscillating arm and the oscillating inertial flywheel. When the mechanism rotates centrifugal forces on the oscillating arm produce a counteracting torque that tends to return the oscillating (Continued)

inertial flywheel and the member to be damped toward the equilibrium position. The counteracting torque increases with the rotation speed of the filtering mechanism and with the amplitude of the angular deflection.

24 Claims, 16 Drawing Sheets

(51) Int. Cl.
*F16D 3/12* (2006.01)
*F16H 45/02* (2006.01)

(56) References Cited

U.S. PATENT DOCUMENTS

| | | | |
|---|---|---|---|
| 6,394,908 B1* | 5/2002 | Lambert | F16F 15/13128 192/201 |
| 2006/0009295 A1* | 1/2006 | Song | F16D 3/12 464/66.1 |
| 2013/0072338 A1* | 3/2013 | Dogel | F16F 15/1478 475/116 |

FOREIGN PATENT DOCUMENTS

| | | |
|---|---|---|
| EP | 2017497 A1 | 1/2009 |
| FR | 2857073 A1 | 1/2005 |
| WO | WO0131226 A1 | 5/2001 |

* cited by examiner

MECHANISM FOR FILTERING TORQUE FLUCTUATIONS OF SECONDARY MEMBER

CROSS-REFERENCE TO RELATED APPLICATIONS AND CLAIM TO PRIORITY

This application is a national stage application of International Application No. PCT/FR2014/052779 filed Oct. 31, 2014, which claims priority to French Patent Application No. 1454219 filed May 12, 2014 and French Patent Application No. 1360749 filed Oct. 31, 2013, the disclosures of which are incorporated herein by reference and to which priority is claimed.

FIELD OF THE INVENTION

The invention relates to a mechanism for damping irregularities of an internal combustion engine, in particular for application to a motor vehicle, and in particular to a dual mass flywheel, to a friction damper, or to a torque converter.

BACKGROUND OF THE INVENTION

In order to attenuate rotational irregularities of an internal combustion engine crankshaft, principally at speeds between idle speed and an intermediate engine speed, for example approximately 2500 revolutions per minute, it has been proposed in the document FR2857073 to couple, directly to the crankshaft of an internal combustion engine, an inertial flywheel that attenuates torsional vibrations or rotational speed fluctuations, comprising two coaxial inertial masses, a first of which is rotationally integral with the crankshaft and has a starter ring gear and a reaction plate of a friction clutch, while the second is rotationally movable with respect to the first as a result of pivot-mounted connecting modules each having at least one oscillating arm that pivots with respect to the first inertial mass around an axis parallel to the axis of revolution; an oscillating mass positioned at a free end of the oscillating arm so as to be movable in an essentially radial direction; and a link connecting an intermediate point of the oscillating arm to the second inertial mass. Thanks to a centrifugal effect, the pivot-mounted modules resist the relative rotation of the inertial masses, exerting a return torque substantially proportional to the relative rotation of the two inertial masses and to the square of the rotation speed of the inertial mass connected to the crankshaft. Given that it is installed directly on the crankshaft, this device tends to increase the moment of inertia to be overcome at startup. Given that it constitutes the first filtering stage for engine torque fluctuations, the mechanism must be dimensioned with considerable inertia so that it has a significant effect, and the pivot-mounted modules that experience these non-attenuated fluctuations must themselves be particularly robust. An elevated primary inertia likewise results in an elevated inertia downstream from the inertial flywheel, at the friction clutch and at any filtering devices interposed between the clutch and the transmission; this conflicts with the objectives of reduced consumption and lighter-weight mechanisms.

SUMMARY OF THE INVENTION

The intent of the invention is to eliminate the drawbacks of the existing art and to improve the filtering of engine torque variations at low engine speed, in particular, as a guideline, below 2000 revolutions per minute.

To achieve this, according to a first aspect of the invention a filtering mechanism for torque fluctuations and/or rotation speed fluctuations, interposed between a crankshaft of an internal combustion engine rotating around an axis of revolution and a transmission, is proposed, having a member to be damped rotating around the axis of revolution, an oscillating inertial flywheel rotating around the axis of revolution with respect to the member to be damped, and a connecting mechanism between the oscillating inertial flywheel and the member to be damped, the connecting mechanism having pivot-mounted modules allowing an angular deflection, on either side of an equilibrium position, of the oscillating inertial flywheel with respect to the member to be damped, the pivot-mounted modules each having at least one oscillating arm pivoting radially with respect to the member to be damped and a kinematic connecting member between the oscillating arm and the oscillating inertial flywheel, positioned so that when the mechanism rotates around the axis of revolution, the centrifugal forces on the oscillating arm produce on the member to be damped a counteracting torque that tends to return the oscillating inertial flywheel and the member to be damped toward the equilibrium position, the counteracting torque increasing with the rotation speed of the mechanism and with the amplitude of the angular deflection. According to the invention the mechanism furthermore has a primary member interposed kinematically between the crankshaft and the member to be damped, the latter constituting a secondary member rotating around the axis of revolution with respect to the primary member. The oscillating inertial flywheel, located on the secondary, is not to be driven by the starter during startup in a declutched position. In addition, it becomes possible to interpose a filtering stage between the crankshaft and the member to be damped, which allows a reduction in the mass of the oscillating arms and in the inertia of the flywheel for an equivalent effect. The filtering mechanism allows implementation of an apparent stiffness that varies with rotation speed, without a spring.

Preferably the mechanism has a coupling device for coupling the oscillating inertial flywheel to the secondary member when the rotation speed of the mechanism exceeds a predetermined speed threshold, which in practice is above the idle speed of the engine, for example a speed threshold above 1500 rpm but below 2500 rpm.

According to a preferred embodiment each oscillating arm is arranged facing a corresponding stop in order to limit the outward radial motion of each oscillating arm.

The stops can be positioned on the secondary member. According to a preferred embodiment, however, the stops are integral with the oscillating inertial flywheel in order to couple the flywheel, via the centrifugal effect, to the member to be damped when the speed exceeds a predetermined threshold. The stops are preferably arranged so that the corresponding oscillating arms only come into contact with them when the rotation speed of the member to be damped is sufficient that the centrifugal force causes an elastic deformation of the pivot-mounted modules.

According to a particularly advantageous embodiment, the mechanism has elastic return elements in order to return the secondary member toward a reference angular position with respect to the primary member. The result is to constitute, upstream from the secondary member in the kinematic transmission system, a first filtering stage between the primary member and the secondary member. The second filtering stage, constituted by the oscillating inertial flywheel connected to the secondary member, has a filtering characteristic that varies as a function of rotation speed. Since the fluctuations experienced by the secondary member are attenuated by the first filtering stage, it is possible to obtain the desired supplementary filtering effect with oscillating arms and a flywheel which have reduced masses.

According to an embodiment, provision can be made in particular to receive the elastic elements at least partly in a volume located between the primary member and secondary member, such that spring reception windows constitute the elastic return means.

Friction elements can also be provided, as appropriate, to dissipate energy in the context of relative angular motions between the primary member and secondary member.

According to an embodiment one of the primary and secondary members comprises a web, and the other of the primary and secondary members comprises two guide washers fastened to one another and located axially on either side of the web. The member to be damped can thus be constituted by the web or by one of the washers, or can be integral with the web or with one of the washers.

According to an embodiment the primary member has an interface for fastening to the crankshaft, constituted e.g. by holes for the passage of screws or rivets. With this hypothesis of a primary member fastened directly to the crankshaft, the primary member can also constitute a starter ring gear. It can also constitute a primary inertial flywheel.

According to an embodiment one of the primary and secondary members is integral with friction surfaces of a friction clutch.

According to a first variant the friction surfaces are carried by the primary member, which is connected to the secondary member by filtering springs so as to form a friction clutch with integrated filtering.

According to another variant the friction surfaces are integral with the secondary member, a dual mass flywheel being constituted by the primary member and the secondary member with the interposition of elastic elements.

Rotational guidance of the inertial flywheel can be achieved in various ways, and in particular by a bearing installed on the primary member, on the secondary member, or on a part, for example a hub or a collar, integral with the primary member or with the secondary member.

According to an embodiment the secondary member has a connecting interface to an input shaft of the transmission, which can be implemented in particular in the form of a splined hub.

In order to prevent any imbalance, there is an even number of pivot-mounted connecting modules and they are symmetrical pairwise with respect to the axis of revolution and are preferably symmetrical pairwise with respect to a plane of symmetry including the axis of revolution, which is beneficial in terms of overall dimensions.

According to an embodiment the pivot-mounted connecting modules are arranged axially between the inertial flywheel and the primary member, and/or between the secondary member and the primary member, and/or inside a receptacle of the primary member.

According to an embodiment the kinematic connecting member has at least one rolling body, preferably a roller. Preferably the oscillating arm pivots around a pivot axis with respect to the member to be damped, the rolling body having a rotation axis parallel to the pivot axis.

Preferably the rolling track formed on the oscillating arm and the rolling track formed on the oscillating inertial flywheel are configured so that the counteracting torque increases with rotation speed and with the amplitude of the angular deflection. Preferably the rolling track formed on the oscillating arm faces radially outward. The rolling track formed on the oscillating arm is concave in a section plane perpendicular to the axis of the revolution. The rolling track formed on the oscillating inertial flywheel likewise preferably faces radially inward and is preferably concave in a section plane perpendicular to the axis of revolution.

Preferably the rolling track formed on the oscillating inertial flywheel, the rolling track formed on the oscillating arm, and the rolling body are such that in the reference position, the rolling body is in a maximally distant position with respect to the axis of revolution.

Preferably the rolling track formed on the oscillating inertial flywheel, the rolling track formed on the oscillating arm, and the rolling body are such that in the reference position, a radial axis passing through the axis of revolution and through a contact point between the rolling body and the rolling track formed on the oscillating inertial flywheel is perpendicular, in a plane perpendicular to the axis of revolution, to the rolling track formed on the oscillating inertial flywheel.

According to an embodiment the rolling track formed on the oscillating inertial flywheel, the rolling track formed on the oscillating arm, and the rolling body are such that in the reference position, a radial axis passing through the axis of revolution and through a contact point between the rolling body and the rolling track formed on the oscillating arm is perpendicular, in a middle plane perpendicular to the axis of revolution, to the rolling track formed on the oscillating arm.

According to another embodiment the kinematic connecting member has a connecting link between the oscillating arm and the oscillating inertial flywheel. Preferably the oscillating arm pivots with respect to the secondary member around a first pivot axis, the link pivots around the oscillating arm around a second pivot axis and with respect to the oscillating inertial flywheel around a third pivot axis, all of which are parallel to the axis of revolution. The pivots implementing the first, second, and third pivot axis, or some of them, can be plain or rolling bearings defining pivot axes that are fixed with respect to the pivot-mounted parts. At least one of them can also be a rolling pivot, having a male part of smaller diameter than the female part that receives it or having two sleeves in which a roller rolls, in order to impart to the pivot axes a slight degree of freedom with respect to the pivot-mounted parts.

According to an embodiment the first pivot axis is located at an end of the oscillating arm, the second pivot axis between the link and the oscillating arm being positioned in an intermediate position between the first pivot axis and the opposite free end of the oscillating arm. This free end is preferably solid, and can be equipped with applied masses.

The oscillating arm of each module preferably extends in a circumferential direction, so that the motion of the oscillating arms is essentially radial with respect to the axis of revolution.

According to an embodiment the second pivot axis is located at a distance from the intermediate axis of revolution between the first pivot axis and the third pivot axis, at least when the second and third pivot axes are coplanar with the axis of revolution.

Preferably the first, second, and third axes are arranged in such a way that the oscillating arm is at its apogee, in the position on its trajectory farthest from the axis of revolution, when the second pivot axis and the third pivot axis are located in a radial plane containing the axis of revolution. The corresponding relative position of the member to be damped and of the oscillating inertial flywheel constitutes an equilibrium position that is achieved at a steady-state speed in the absence of any engine torque fluctuation. Any relative angular motion between the member to be damped and the oscillating inertial flywheel out of this reference position has the effect of bringing the oscillating arms closer to the axis of revolution.

Preferably the first, second, and third pivot axes are arranged in such a way that at rest, the distance between the oscillating arm and the stop passes through a non-zero minimum when the second pivot axis, the third pivot axis, and the axis of revolution are positioned in one radial plane. The oscillating arms only come into contact with the corresponding stops, in order to couple the oscillating inertial flywheel to the member to be damped, when the rotation speed of the member to be damped is sufficient to cause an elastic deformation of the connecting modules, that deformation being capable of being localized at the oscillating arms, at the pivots, and/or at the link. Preferably the oscillating arms have a middle part, located between their pivot axis on the member to be damped and their free end coming into contact with the stop, that is relatively flexible, in order to allow them to deform in response to centrifugal force.

The third pivot axis can be located radially inside or outside the second pivot axis.

According to another aspect of the invention it relates to a mechanical assemblage having a filtering mechanism as described above and a single or dual friction clutch having friction surfaces, in particular friction linings, integral with the primary member or with the secondary member. It relates in particular to an assemblage of this kind whose clutch has a friction web integral with the secondary member. A friction web located axially at a distance from the member to be damped, and coupled to the member to be damped by means of a connecting part, can in particular be provided. Such will be the case in particular if a pressure plate of the clutch is received axially between the secondary member and the friction web, in particular in the case of a dual friction clutch. As has been explained previously, the filtering mechanism can be arranged kinematically upstream or downstream from the friction clutch.

BRIEF DESCRIPTION OF THE DRAWINGS

Other characteristics and advantages of the invention will emerge upon reading the description below, referring to the attached drawings in which.

For greater clarity, identical or similar elements are labeled with identical reference characters in all the Figures.

DETAILED DESCRIPTION OF THE PREFERRED EMBODIMENT(S)

Figure 1:
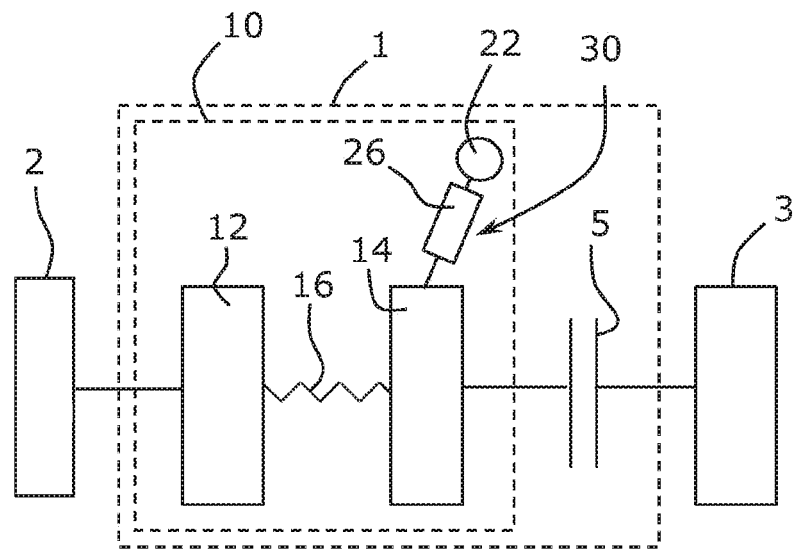
FIG. 1 is a schematic view of a dual inertial flywheel kinematic transmission system comprising a filtering mechanism according to an embodiment of the invention.

FIG. 1 illustrates a motor vehicle kinematic transmission system 1 having a dry clutch 5 located between a crankshaft 2 and a transmission input shaft 3. Arranged upstream from the clutch in the kinematic transmission system is a filtering mechanism 10 constituting, in this embodiment, a dual mass flywheel, and having a primary member 12 constituted by a primary flywheel connected to crankshaft 2 and a secondary member 14 constituted by a secondary flywheel integral with the primary of clutch 5. An elastic member 16 is interposed between primary flywheel 12 and secondary flywheel 14 so as to operate in the context of angular positioning fluctuations between primary flywheel 12 and secondary flywheel 14. A pivot-mounted oscillating mechanism 30 according to the present invention, having an oscillating inertial flywheel 22 connected to secondary flywheel 14 by pivot-mounted connecting modules 26, allows attenuation of low-speed vibrations of second flywheel 14.

FIGS. 2 to 5 illustrate the structure of dual mass flywheel 10, which comprises primary inertial flywheel 12 constituting the primary member of the filtering mechanism, secondary inertial flywheel 14 constituting the secondary member of the filtering mechanism, and curved springs 16 abutting at their ends against primary inertial flywheel 12 and against secondary inertial flywheel 14 so as to be loaded as a function of the relative angular motions between primary inertial flywheel 12 and secondary inertial flywheel 14 around an axis of revolution 100 of dual mass flywheel 10. Primary inertial flywheel 12 is constituted conventionally by several parts integral with one another, in particular by two guide washers 12.1, 12.2 flanking a web 14.1 belonging to the secondary flywheel; this arrangement ensures guidance of springs 16. One of the guide washers 12.1 forms a receptacle, while the other takes the form of a cover 12.2. Primary flywheel 12 is equipped here with a starter ring gear 12.3, with a part 12.4 forming a hub and a fastening plate provided with passage holes 12.5 for screws 18 for fastening to the crankshaft, and with a solid outer ring 12.6. Web 14.1 of secondary flywheel 14 is integral with a solid part 14.2 offset axially outside the volume delimited by guide washers 12.1, 12.2. This solid part 14.2 is rotationally guided on hub 12.4 of primary flywheel 12 by means of a rolling bearing 20. In a manner known per se, solid part 14.2 of secondary flywheel 14 is directly in contact with friction linings (not depicted) of a friction clutch.

Oscillating inertial flywheel 22, constituted by a peripheral ring 22.1 and a web 22.2, is rotationally guided around axis of revolution 100 by a plain bearing 24 interposed between web 22.2 and secondary flywheel 14. In order to damp torque fluctuations of the secondary flywheel, oscillating inertial flywheel 22 is connected to secondary flywheel 14 by means of four pivot-mounted connecting modules 26 arranged symmetrically pairwise with respect to axis of revolution 100 and symmetrically pairwise with respect to a plane of symmetry containing the axis of revolution. Each pivot-mounted connecting module 26, illustrated in more detail in FIGS. 4 and 5, has an oscillating arm 26.1 pivot-mounted on secondary inertial flywheel 14 by means of a first pivot 26.2 in order to pivot around a first pivot axis 200, and a link 26.4 pivot-mounted on oscillating arm 26.1 by means of a second pivot 26.5 defining a second pivot axis 300, and on oscillating inertial flywheel 22 by means of a third pivot 26.7 defining a third pivot axis 400. Free end 26.9 of each oscillating arm 26.1, opposite first pivot 26.2, is solid and is constituted in this embodiment by applied flyweights, but could also be integral with the remainder of oscillating arm 26.1. In an intermediate part 26.10 between pivots 26.2 and 26.5 on the one hand and free end 26.9, oscillating arm 26.1 has a tapered section imparting to it a certain flexibility. Oscillating inertial flywheel 22 is furthermore equipped with four stops 28 corresponding to the four pivot-mounted connecting modules 26, and each located facing the free end of the corresponding oscillating arm 26.1.

The device functions as follows: At rest, at zero rotation speed, oscillating inertial flywheel 22 can be positioned in a reference angular position with respect to second inertial flywheel 14, corresponding to alignment of second pivot axis 300 and third pivot axis 400 of link 26.4 in a radial plane containing axis of revolution 100. This position corresponds to the apogee of the quasi-steady-state trajectory of the free end of oscillating arms 26.1, i.e. that point on their trajectory which is both farthest from axis of revolution 100 and closest to the corresponding stop 28. In this position there is no contact between free end 26.9 of oscillating arm 26.1 and the corresponding stop 28; a small clearance, on the order of a few tenths of a millimeter, is maintained. From this equilibrium angular position, any relative rotation of oscillating inertial flywheel 22 with respect to the secondary inertial flywheel, in one or the other direction, contributes to bringing free end 26.9 of oscillating arms 26.1 closer to the axis of revolution.

When the crankshaft is driving the primary flywheel at low speed, and in particular during the starting phase below idle speed, fluctuations in engine torque are not effectively filtered by the springs of dual mass flywheel 10. In this speed range the torque fluctuations at each cylinder ignition are transmitted to secondary flywheel 14 and cause the relative angular positioning of secondary flywheel 14 and oscillating inertial flywheel 22 to fluctuate with a phase lag. The connecting mechanism constituted by the four pivot-mounted modules 26 allows an angular deflection, on either side of the equilibrium position, of the oscillating inertial flywheel with respect to secondary flywheel 14. The oscillating arm, as it rotates with secondary flywheel 14 around axis of revolution 100, applies to pivot 26.5 a force in the direction defined by the two pivots 26.5 and 26.7. When the system is in the equilibrium position the link is oriented radially, and the resultant forces at pivot 26.7, which are themselves radial, cause no return torque. The effect of the fluctuations in the relative angular positioning of the secondary flywheel and oscillating flywheel is to change the angle of the resultant of the forces transmitted by link 26.4 to secondary flywheel 14, causing a return torque toward the equilibrium position which is approximately proportional to the amplitude of the angular deflection and to the square of the rotation speed around the axis of revolution. Pivot-mounted oscillating mechanism 30, constituted by oscillating inertial flywheel 22 connected to secondary flywheel 14 by connecting modules 26, behaves like a filter whose stiffness is variable as a function of speed, resisting torque variations of the member that is constituted by secondary flywheel 14.

When the rotation speed around the axis of revolution increases, the resultant of the centrifugal forces applied by oscillating arm 26.1 to pivot 26.5 increases, and the amplitude of the angular deflections between secondary flywheel 14 and oscillating inertial flywheel 22 decreases. Flexible part 26.10 of the oscillating arm tends to deform elastically, and free end 26.9 of the oscillating arm gradually comes closer to stop 28. Above a given critical speed, for example 2200 rpm, free end 26.9 of oscillating arm 26.1 comes into contact with the stop, the result of which is to couple oscillating inertial flywheel 22 to secondary flywheel 14. The inertia of oscillating flywheel 22 is then added to that of secondary flywheel 14. As the rotation speed continues to increase, the forces on pivots 26.2, 26.5, and 26.7 remain relatively stable due to the abutment against stop 28.

The dual mass flywheel alone has a natural frequency of about 1000 rpm, lower than the idle speed of the engine but higher than the crankshaft speed during the starting phase, and exhibits very good attenuation around 2000 rpm. By combining dual mass flywheel 10 with pivot-mounted oscillating mechanism 30, the excellent attenuation of oscillating inertial flywheel 22 at low speeds is obtained, then the filtering mechanism is blocked at higher speeds at which dual mass flywheel 10 is most effective; the effect of this blockage of oscillating inertial flywheel 22 is to increase the secondary inertia of dual mass flywheel 10. Premature wear on pivots 26.2, 26.5, and 26.7 of connecting modules 26 is thus avoided.

Figure 6:
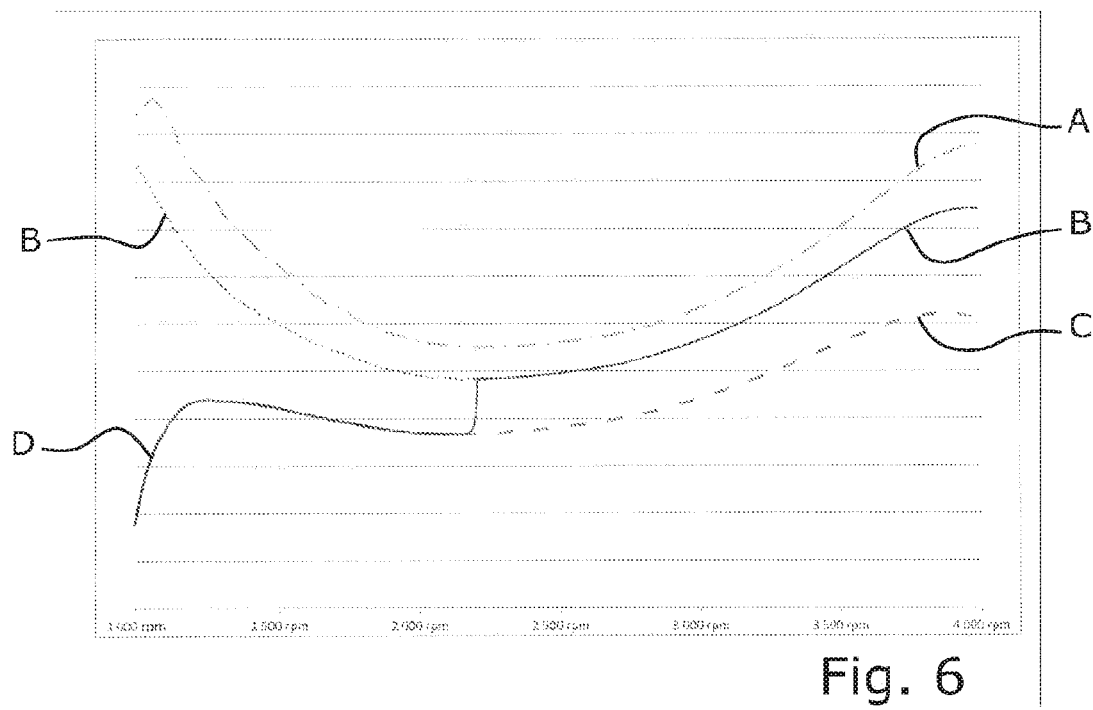
FIG. 6 is a diagram comparing the attenuation as a function of rotation speed of a conventional dual mass flywheel, of a hypothetical dual mass flywheel equipped with the mechanism according to the present invention without a stop, of a dual mass flywheel equipped with the mechanism according to the present invention with a stop, and of a hypothetical dual mass flywheel equipped with the mechanism according to the present invention, the stop of which is assumed to be always active.
Figure 3:
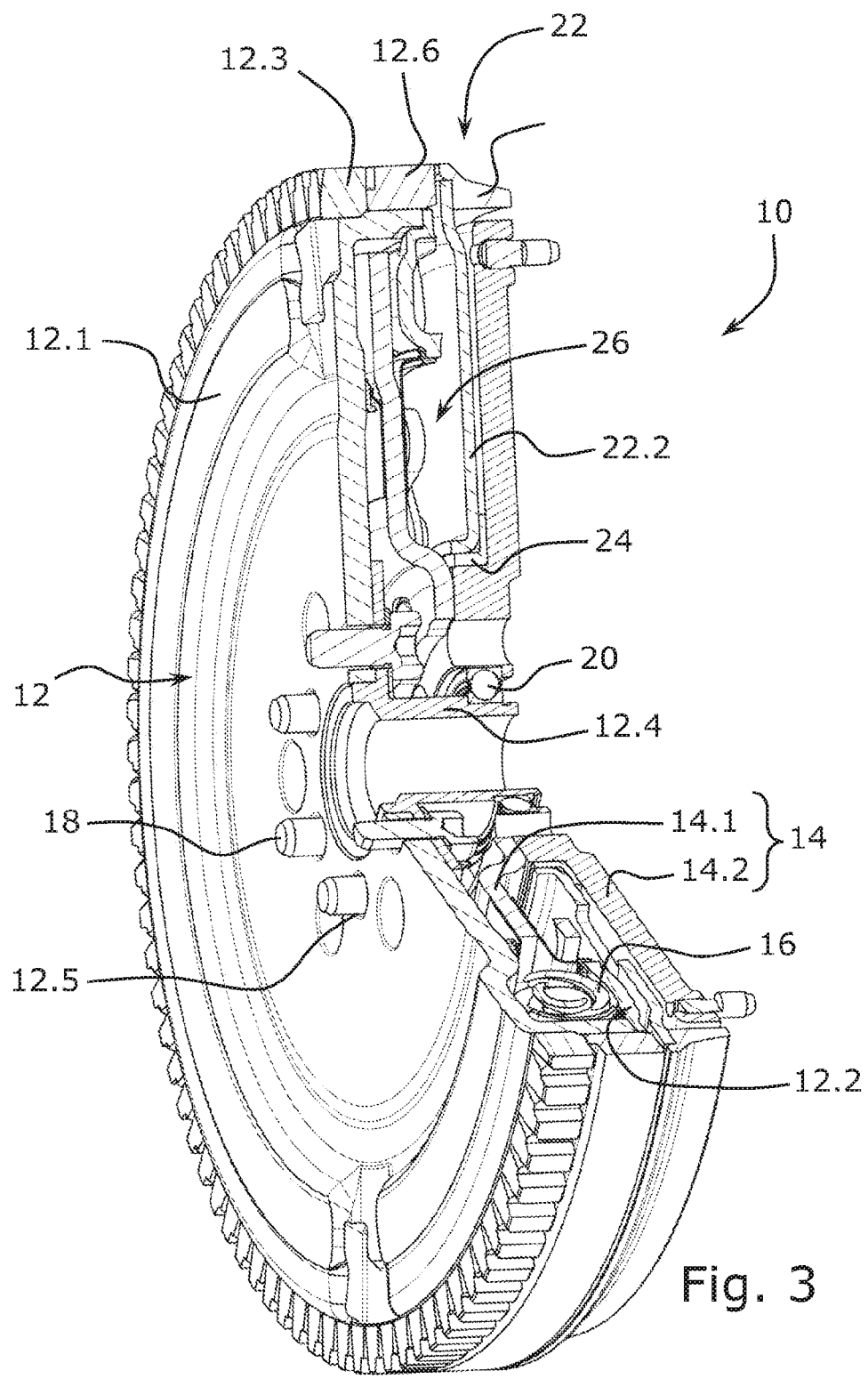
FIG. 3 is an isometric sectioned view of part of the dual inertial flywheel of FIG. 2 along the half section planes G-G of FIG. 2.
Figure 4:
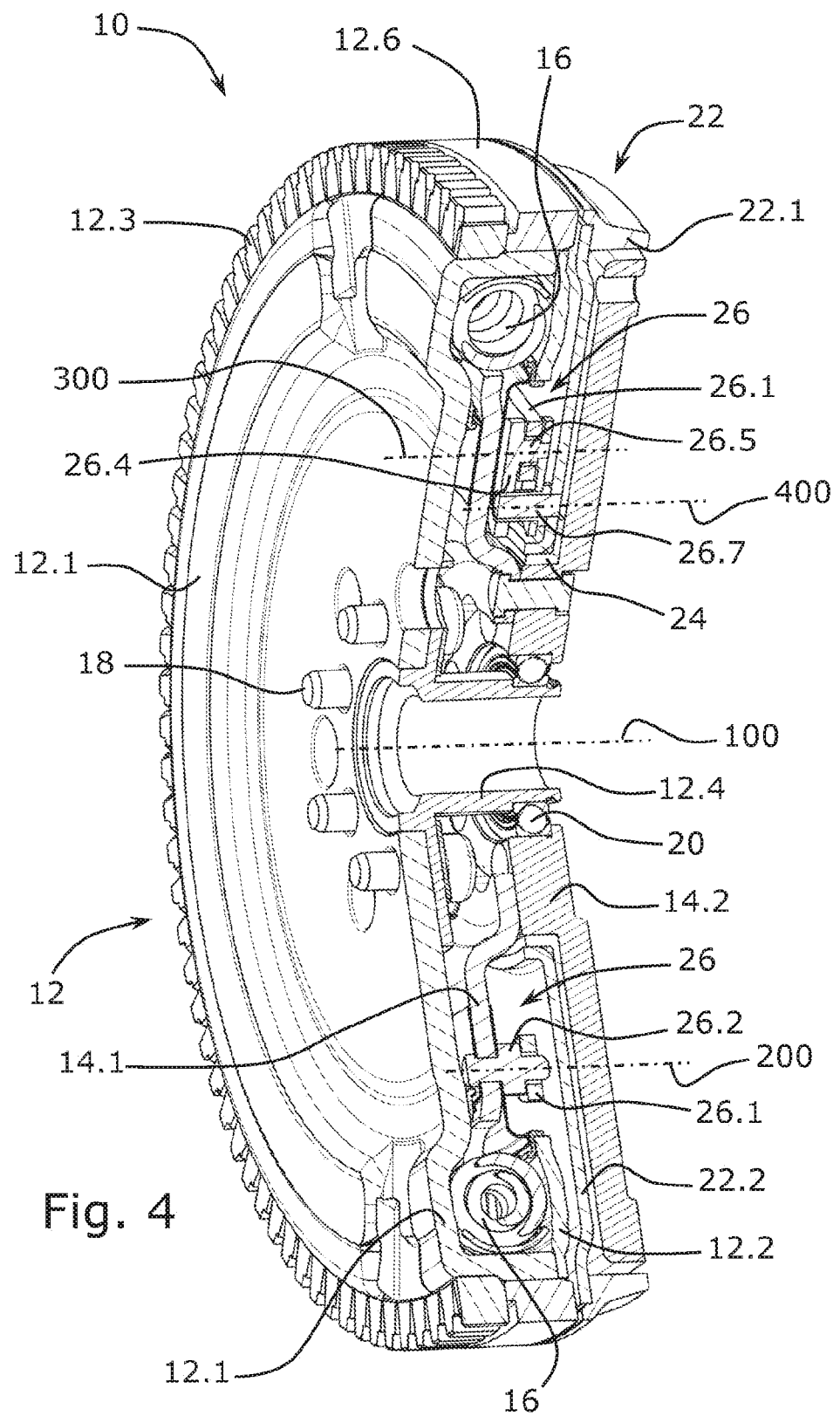
FIG. 4 is an isometric sectioned view of part of the dual inertial flywheel of FIG. 2 along the half section planes H-H of FIG. 2.
Figure 5:
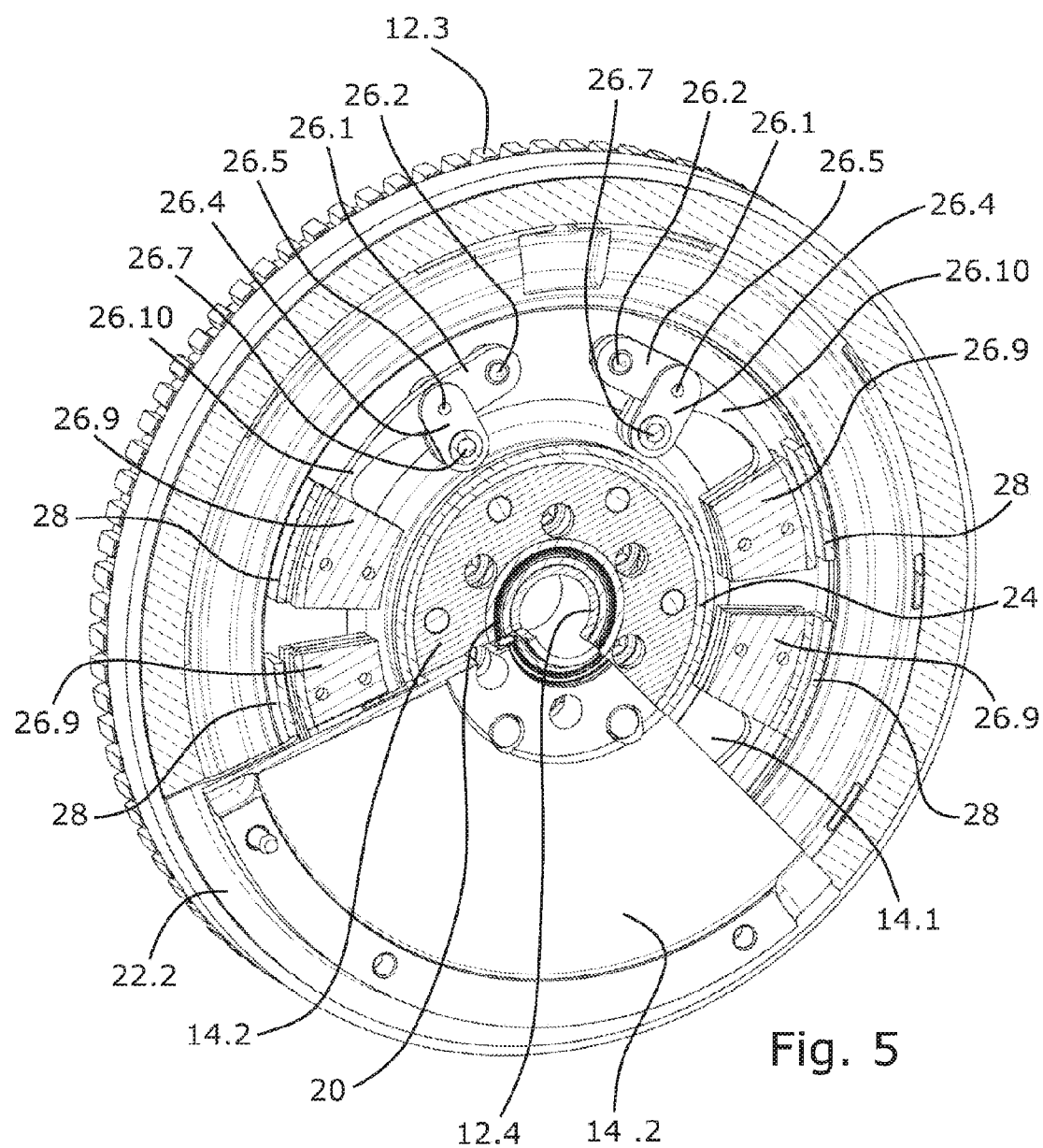
FIG. 5 is an isometric view of part of the dual inertial flywheel of FIG. 2.

The combined filtering achieved by the mechanism comprising dual mass flywheel 10 and pivot-mounted oscillating mechanism 30 is illustrated in FIG. 6. The curves in FIG. 6 depict angular acceleration (in radian/s2) as a function of rotation speed (in rpm) for a dual mass flywheel according to FIGS. 1 to 7 having no oscillating flywheel (curve A), for a hypothetical dual mass flywheel according to FIGS. 1 to 7 whose connecting modules are assumed to be blocked and always abutted against stop 28 regardless of engine speed (curve B), for a hypothetical dual mass flywheel equipped with the oscillating flywheel but with no stop 28 (curve C), and lastly for the dual mass flywheel according to FIGS. 1 to 7 equipped with oscillating inertial flywheel 22 and with stop 28 that is active above 2200 rpm (curve D, solid line). It is evident that attenuation would be optimum according to curve C, but the corresponding device would break at high speed as a result of centrifugal forces. The system according to the present invention (curve C) is more effective at low speed than a dual mass flywheel (curve A), and above the critical speed conforms to the behavior of a dual mass flywheel that is assumed to have a secondary inertia equivalent to the sum of the inertias of secondary flywheel 14 and oscillating inertial flywheel 22.

Figure 7:
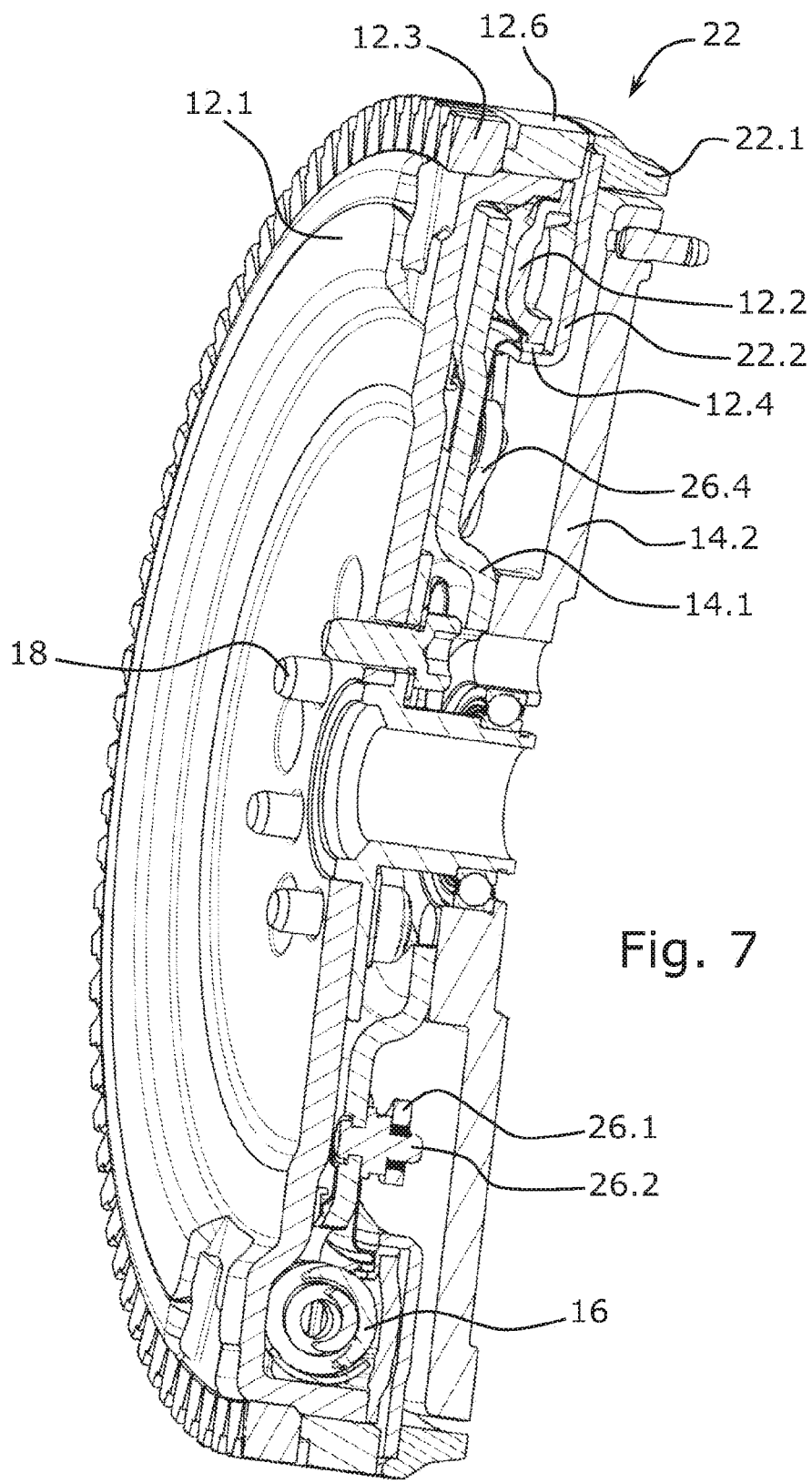
FIG. 7 is a partly sectioned isometric view of a dual mass flywheel comprising a filtering mechanism according to another embodiment of the invention.

FIG. 7 illustrates a dual mass flywheel equipped with a filtering mechanism according to a variant of the preceding embodiment, which differs therefrom essentially in terms of the placement of plain bearing 24 for rotational guidance of oscillating inertial flywheel 22, which here is carried by cover 12.2 of primary member 12. The construction and operation are otherwise identical to the embodiment of FIGS. 1 to 5, which should be referred to for additional details.

Figure 8:
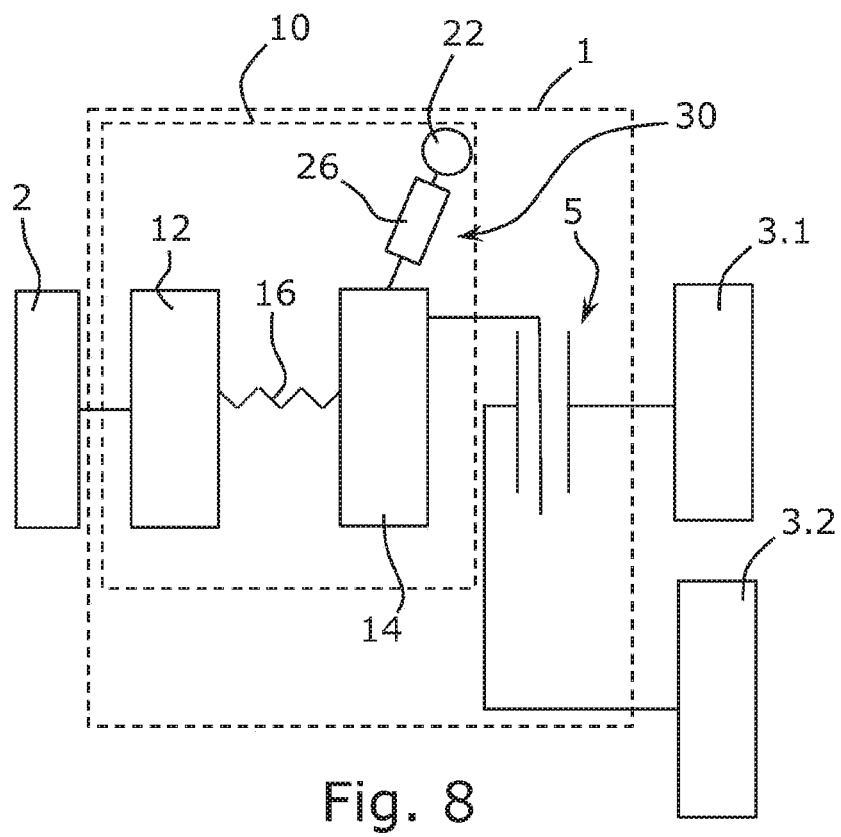
FIG. 8 schematically shows a kinematic dual inertial flywheel transmission system comprising a filtering mechanism according to another embodiment of the invention, arranged upstream from a dual clutch.
Figure 2:
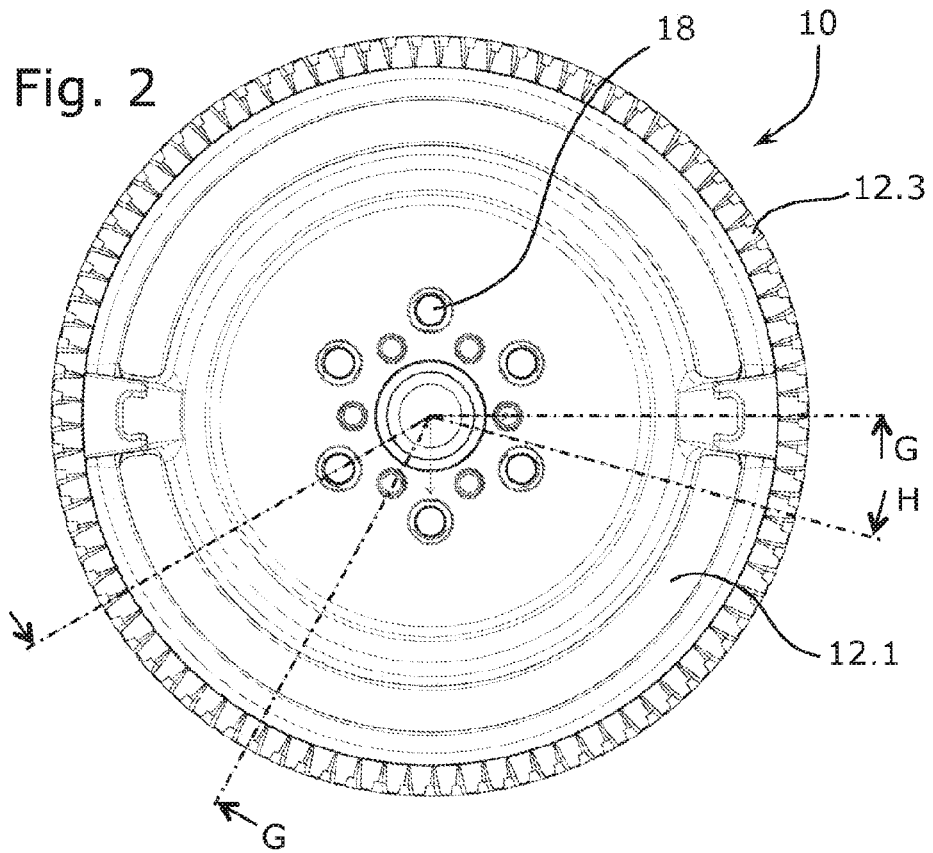
FIG. 2 is a frontal view of the dual inertial flywheel of FIG. 1.
Figure 9:
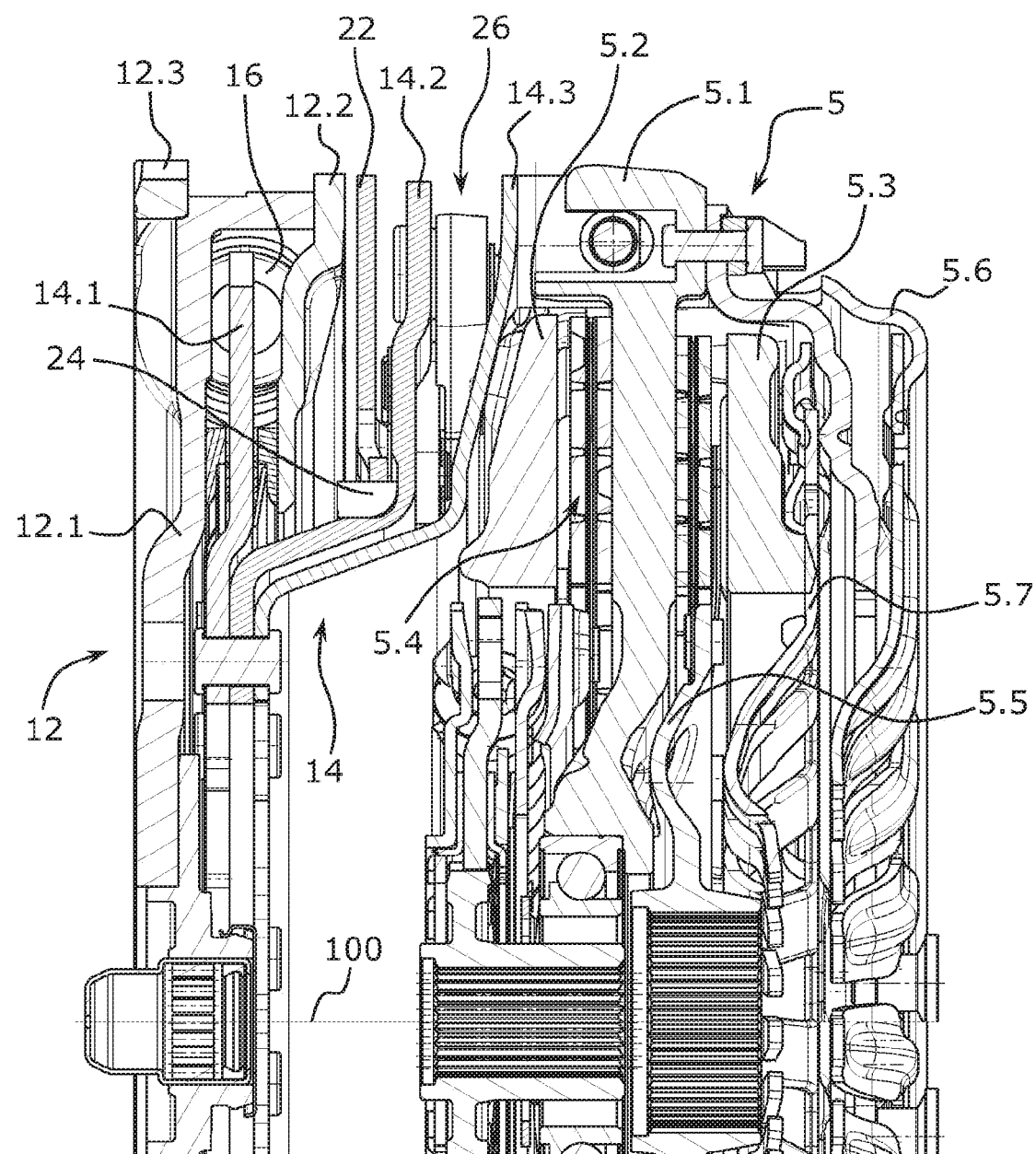
FIG. 9 is a section of the dual clutch comprising the dual mass flywheel and the filtering mechanism according to the embodiment of FIG. 7.
Figure 10:
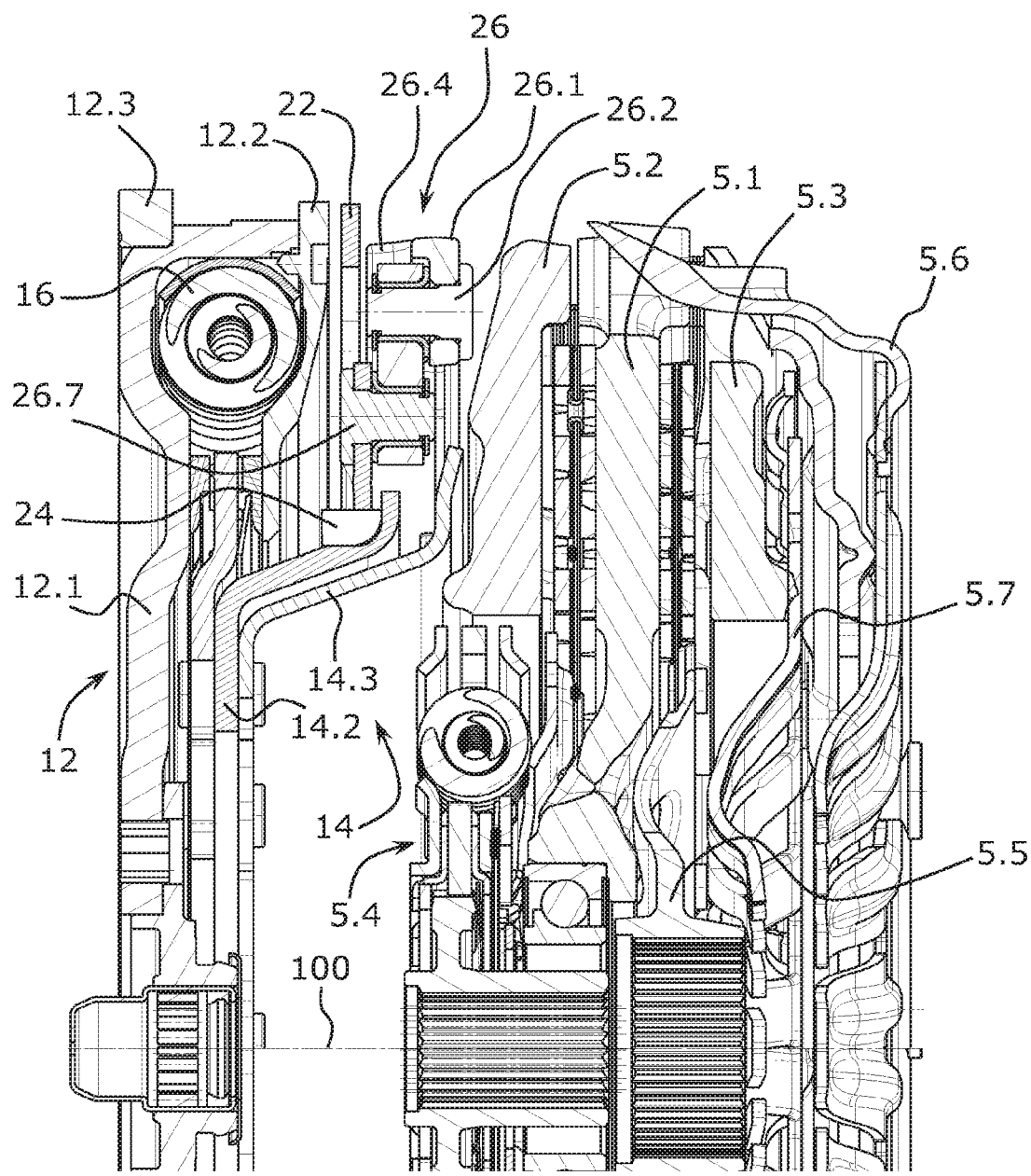
FIG. 10 is another section of the dual clutch of FIG. 9.

FIGS. 8 to 10 illustrate a dual mass flywheel 10 comprising a pivot-mounted oscillating mechanism 30 according to the present invention, in combination with a dual clutch 5 for a transmission having two input shafts. The construction of dual mass flywheel 10 is similar to that of the first embodiment of FIGS. 1 to 7. Dual mass flywheel 10 is interposed kinematically between crankshaft 2 and dual clutch 5 that allows two coaxial input shafts 3.1, 3.2 of a transmission 3 to be driven. It is sufficient to note here that the rotating member whose torque fluctuations are to be damped is constituted by secondary flywheel 14 which has, in addition to web 14.1 and offset solid part 14.2, a connecting part 14.3 providing connection to a reaction plate 5.1 of the dual clutch. Oscillating inertial flywheel 22 is installed on a plain or rolling bearing 24 carried by solid part 14.2 in order to rotate around axis of revolution 100, and is connected to secondary flywheel 14 by means of pivot-mounted connecting modules 26 similar to those of the first embodiment. As in the first embodiment, oscillating inertial flywheel 22 is provided with stops that are not visible in the two sections of FIGS. 9 and 10. Dual clutch 5 itself has a known configuration, with a first pressure plate 5.2, a second pressure plate 5.3, a first damped clutch 5.4 connected to the first input shaft of the gearbox, and a second clutch 5.5 connected to the second input shaft of the gearbox. Reaction plate 5.1 of course has friction surfaces facing the two clutches 5.4 and 5.5. The first pressure plate is controlled by means of a first diaphragm 5.6, and the second pressure plate by a second diaphragm 5.7. It is noteworthy that first pressure plate 5.2 is interposed between offset solid piece 14.2 and reaction plate 5.1.

Figure 11:
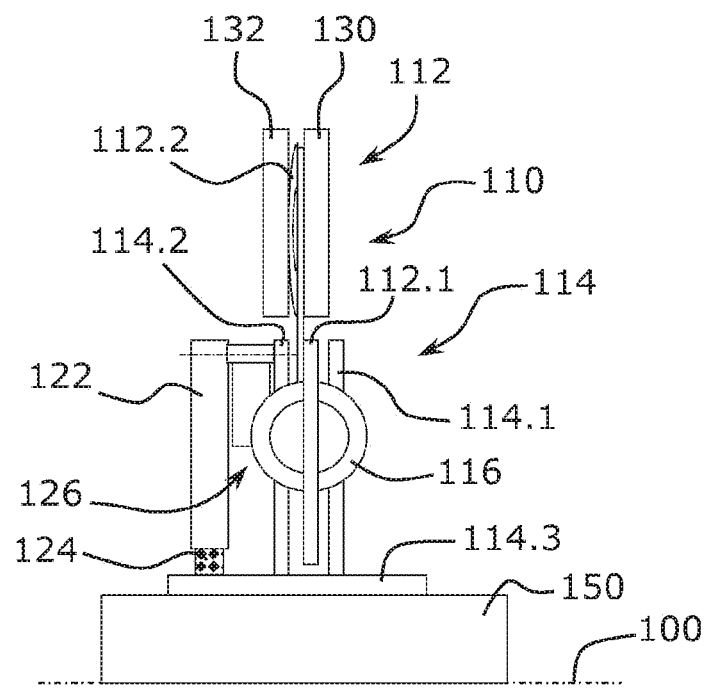
FIG. 11 is a schematic view of a friction clutch incorporating a filtering mechanism according to another embodiment of the invention.

FIG. 11 schematically illustrates the integration of a filtering mechanism according to the present invention into a symmetrical damped friction clutch 110. Primary member 112 of the filtering mechanism is constituted here by web 112.1 carrying friction linings 112.2, which are loaded against a reaction plate 130 by an axially movable pressure plate 132. Web 112.1 is connected via curved springs 116 to a secondary member 114 constituted by two guide washers 114.1, 114.2 that are integral with a splined hub 114.3 shrink-fitted onto input shaft 150 of the transmission. In order to damp torque fluctuations of secondary member 114, an oscillating inertial flywheel 122 is rotationally guided around axis of revolution 100 by a plain or rolling bearing 122, and is connected to one of guide washers 114.2 of secondary member 114 by pivot-mounted connecting modules 126 similar to those of the preceding embodiments. Also provided in this embodiment is a stop (not depicted) in order to couple oscillating inertial flywheel 122 to secondary member 114 above a predetermined speed threshold.

Figure 12:
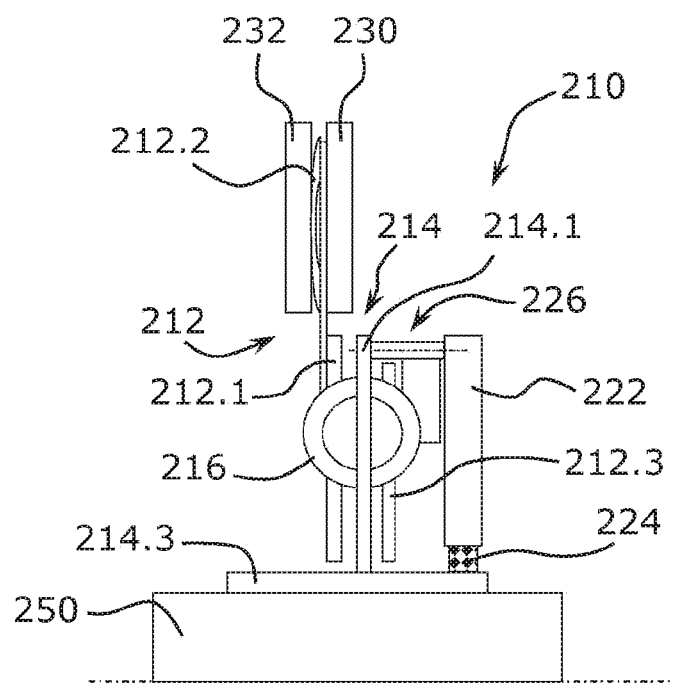
FIG. 12 is a schematic view of a friction clutch incorporating a filtering mechanism according to another embodiment of the invention.

FIG. 12 schematically illustrates the integration of a filtering mechanism according to the present invention into an asymmetrical damped friction clutch 210. Primary member 212 of the filtering mechanism is constituted here by two guide washers 212.1, 212.3, one of which carries friction linings 212.2 that are loaded against a reaction plate 230 by an axially movable pressure plate 232. Guide washers 212.1, 212.3 of the primary member are connected via curved springs 216 to a secondary member 214 constituted by a web 214.1 that is integral with a splined hub 214.3 shrink-fitted onto input shaft 250 of the transmission. For additional damping of the torque fluctuations of secondary member 214, an oscillating inertial flywheel 222 is rotationally guided around axis of revolution 100 by a plain or rolling bearing 222, and is connected to web 214.1 of secondary member 214 by pivot-mounted connecting modules 226 similar to those of the preceding embodiments. Also provided in this embodiment is a stop (not depicted) in order to couple oscillating inertial flywheel 222 to secondary member 214 above a predetermined speed threshold.

Figure 13:
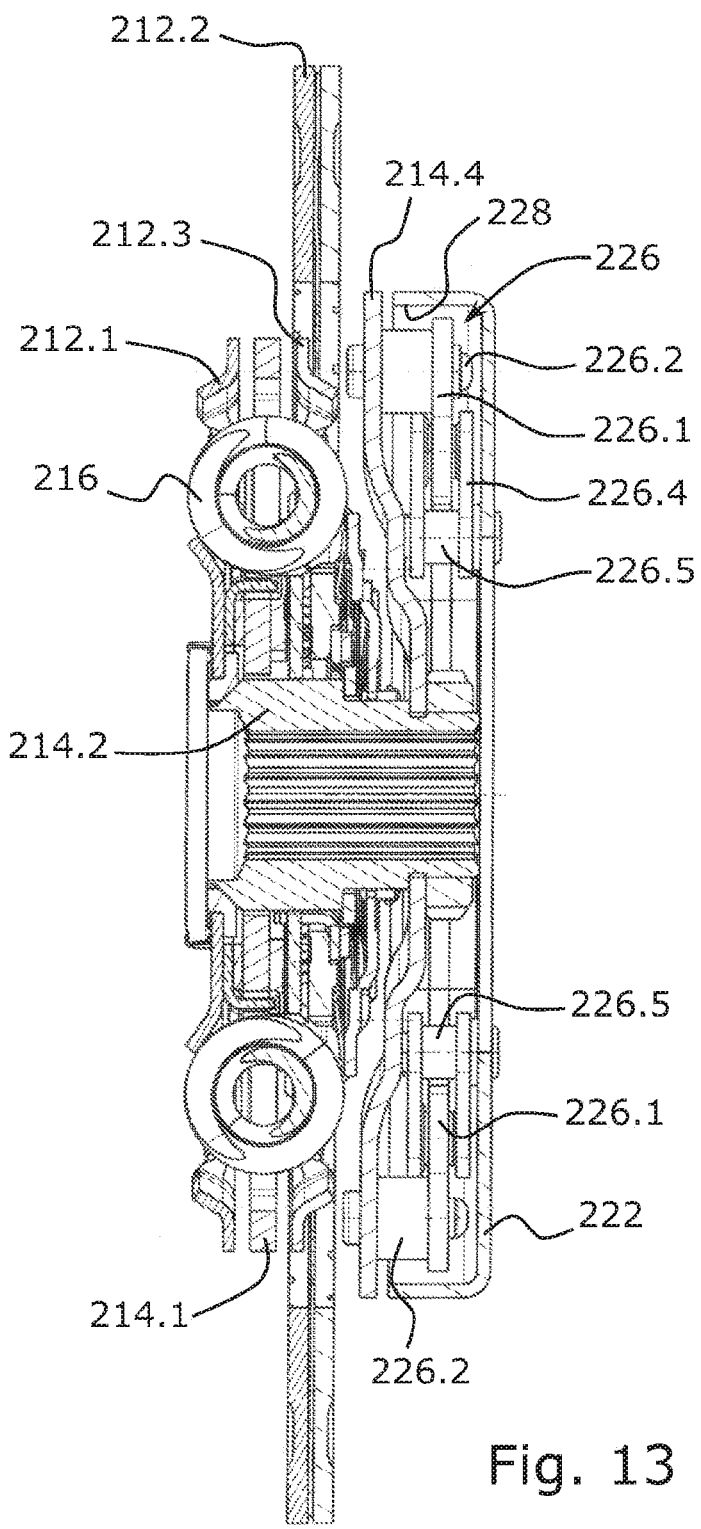
FIG. 13 is a sectioned view of a variant of the friction clutch of FIG. 12.
Figure 14:
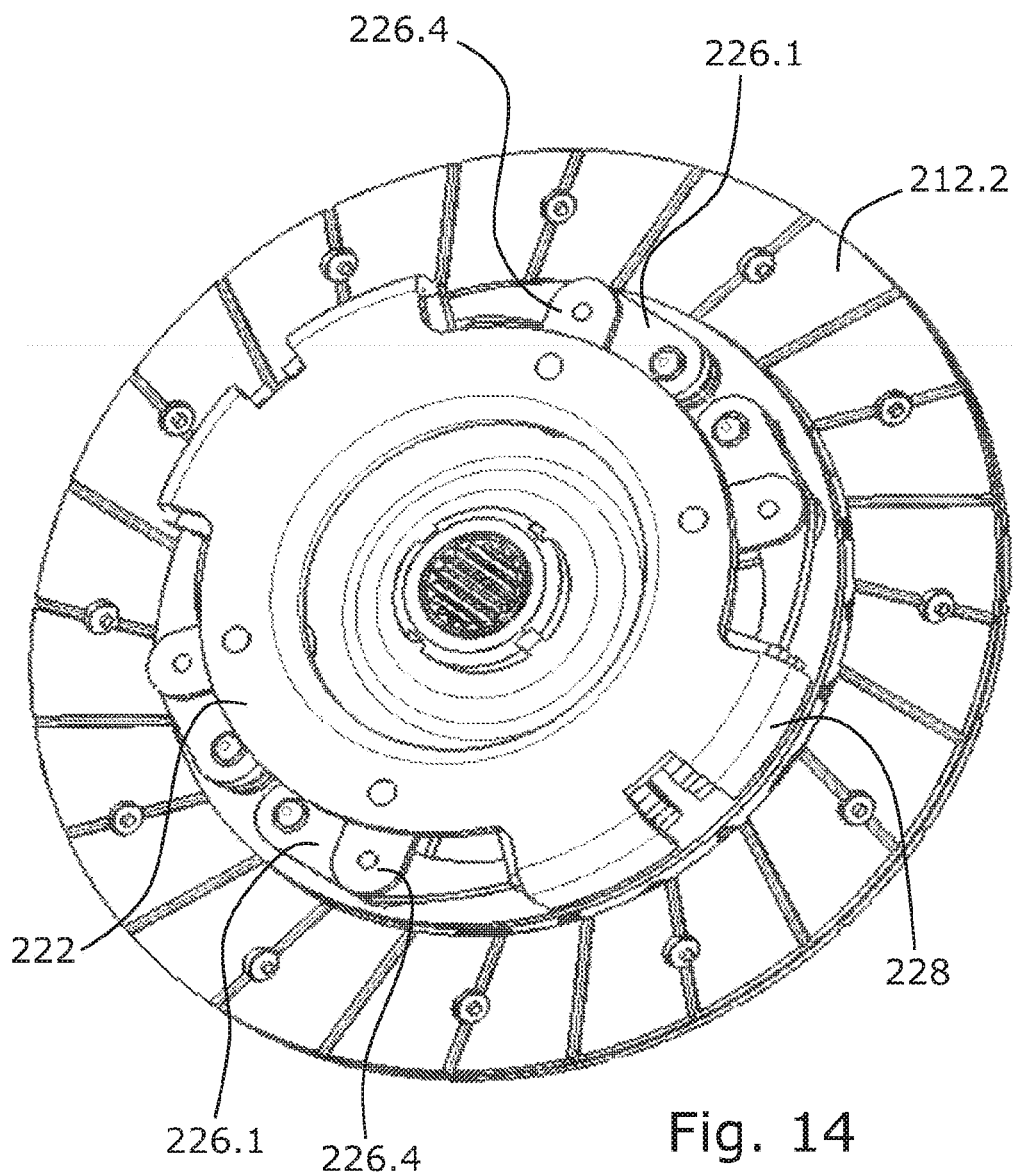
FIG. 14 is a perspective view of the clutch of FIG. 13.

FIGS. 13 and 14 illustrate a construction that corresponds in essence to the schematic diagram of FIG. 11, and for which the same reference characters have been used. This construction differs from the preceding one in that the secondary member has a support plate 214.4 shrink-fitted onto splined hub 214.2 in order to make the connection with oscillating inertial flywheel 222. FIGS. 11 and 12 illustrate oscillating arm 226.1, link 226.4, and pivot mounts 226.2, 226.5, and 226.7 of pivot-mounted connecting modules 226. It is also evident that oscillating inertial flywheel 222 has an axial extension that forms stop 228.

Other variants are of course possible. Provision can be made in particular that the pivot-mounted modules are arranged axially between the oscillating inertial flywheel and the primary member, and/or between the secondary member and primary member, and/or inside a receptacle of the primary member. A receptacle for the oscillating inertial flywheel can also be provided in the primary member. Consideration can also be given to positioning the stops not on the oscillating inertial flywheel but on the secondary member.

Figure 15:
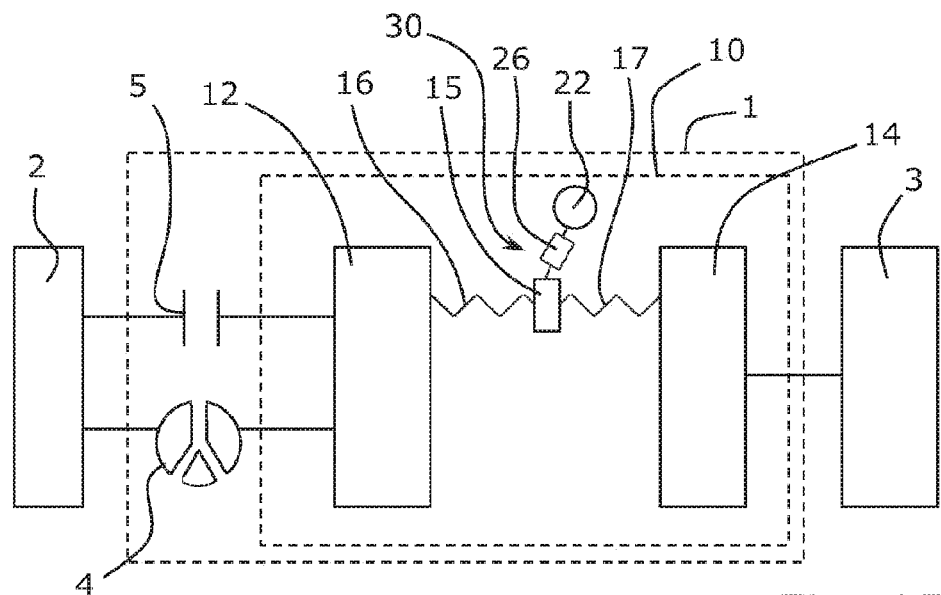
FIG. 15 is a schematic view of a torque converter comprising a torque fluctuation filtering mechanism according to an embodiment of the invention.
Figure 16:
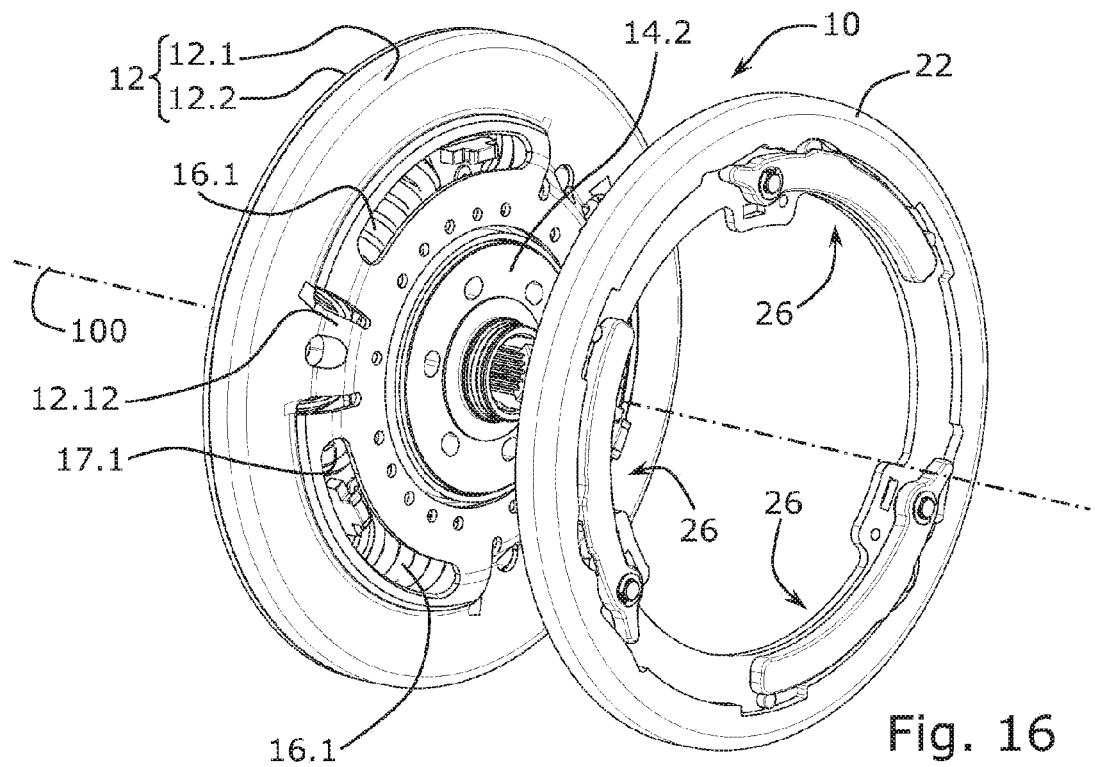
FIG. 16 is an exploded isometric view of the filtering mechanism of FIG. 15.
Figure 17:
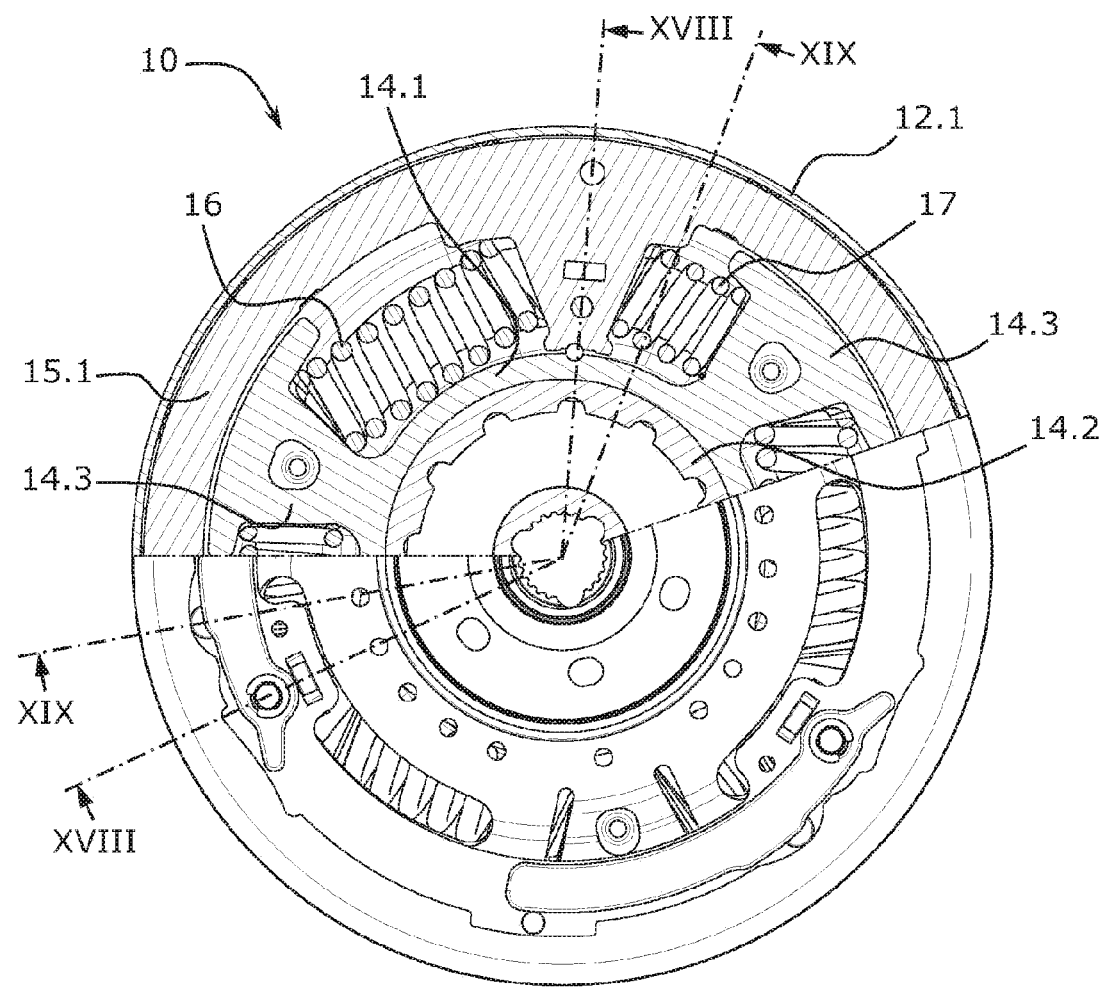
FIG. 17 is a view, partly frontal and partly in transverse section, of the filtering mechanism of FIG. 16.
Figure 18:
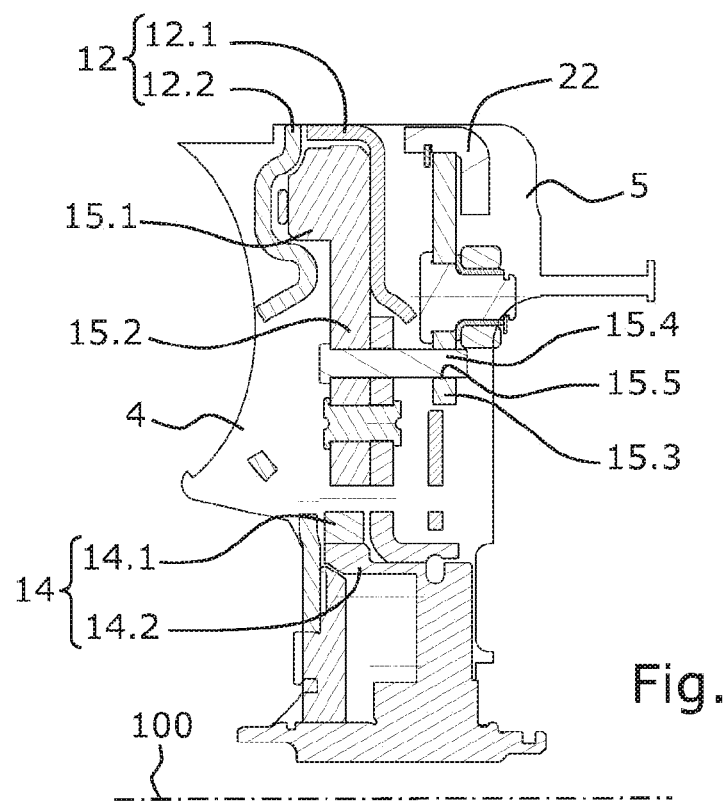
FIG. 18 is an axially sectioned view of the filtering mechanism of FIG. 16 in the section plane XVIII of FIG. 17.

FIG. 15 schematically illustrates a torque converter 1 located between a crankshaft 2 and an input shaft of a transmission 3. This torque converter has, in a manner known per se, a hydrokinetic converter 4 and a locking clutch 5 arranged in parallel between crankshaft 2 and an input member 12 of a torque fluctuation filtering mechanism 10 whose output member 14 is integral with the input shaft of transmission 3. An intermediate phasing member 15 is interposed between input member 12 and output member 14, connected to input member 12 via a first elastic member 16 having a stiffness K1 and to output member 14 via a second elastic member 17 having a stiffness K2. This intermediate member is furthermore connected to an oscillating inertial flywheel 22 by means of connecting modules 26, forming a pivot-mounted oscillating mechanism 30. Analogously to the preceding embodiments, in the present embodiment phasing member 15 constitutes a secondary member rotating with respect to the primary member constituted by input member 12.

As will be more clearly evident from the structural illustrations of FIGS. 16 to 19, input member 12 and output member 14 are members that rotate around one geometric rotation axis 100 and are rotationally movable with respect to one another and each with respect to intermediate phasing member 15, which in turn is also rotationally movable around rotation axis 100. Oscillating inertial flywheel 22 is capable of oscillating angularly with respect to intermediate phasing member 15. First elastic member 16 and second elastic member 17 are arranged in series between input member 12 and output member 14, in such a way that a quasi-steady-state angular displacement of output member 14 with respect to input member 12 in one direction causes an increase in the elastic potential energy of the two elastic members 16, 17, while a relative angular displacement in the opposite direction causes a decrease in the elastic potential energy of the two elastic members 16, 17.

Structurally, input member 12 of filtering mechanism 10 is constituted by a subassembly having a pair of guide washers 12.1, 12.2 fastened to one another in a manner known per se, a housing (not illustrated) of locking clutch 18 fastened to guide washer 12.1, and a turbine hub (not illustrated) of hydrokinetic converter 4 fastened to the other guide washer 12.2. The two guide washers 12.1, 12.2 delimit between them a volume in which is arranged an output web 14.1 that is fastened to a central hub 14.2 and constitutes, with the latter, output member 14. Central hub 14.2 is intended to be slipped onto the input shaft (not depicted) of transmission 3. Output web 14.1 forms a star that, in this embodiment, has three branches 14.3. Guide washer 12.1 is perforated by three large circular-arc-shaped windows 12.11 separated pairwise by three radial material bridges 12.12. In the Figures, the angular positions of material bridges 12.12 of washer 12.1, and of branches 14.3 of output web 14.1, are coincident; but their relative angular positioning can of course vary with the angular variations between input member 12 and output member 14.

Intermediate phasing member 15, constituting the secondary member of filtering mechanism 10, has a phasing web 15.1 provided with three arms 15.2 extending radially inside volume 44, alternatingly with branches 14.3 of star-shaped output web 14.1. Phasing web 15.1 is installed so that it can rotate around central hub 14.2.

Received in the volume delimited by the two guide washers 12.1, 12.2 are springs 16.1, 17.1, six in number, three constituting first elastic member 16 and three constituting second elastic member 17. The three springs 16.1 constituting first elastic member 16 are each tensioned between one of the arms 15.2 of intermediate phasing member 15 and one of the bridges 12.12 constituted in guide washer 12.1, in order to operate in the context of relative angular motions between intermediate phasing member 15 and input member 12. The three springs 17.1 constituting second elastic member 17 are each tensioned between an arm 15.2 of intermediate phasing member 15 and one of the branches 14.3 of output web 14.1, in order to operate in the context of relative angular motions between intermediate phasing member 15 and output member 14. Note that the physical size of springs 16.1 of first elastic member 16 is larger than that of springs 17.1 constituting second elastic member 17, the stiffness K1 of first elastic member 16 preferably being less than that (K2) of second elastic member 17 at a ratio K2/K1 that is, for example, between 2 and 5, preferably between 2 and 3.

Intermediate phasing member 15 also has a flat annular support part 15.3 located outside guide washers 12.1, 12.2. Phasing web 15.1 has spacers 15.4 that project axially through windows cut into guide washer 12.2 and become inserted into openings 15.5 provided for that purpose in annular support part 15.3, in order to couple annular support part 15.3 to phasing web 15.1.

Oscillating inertial flywheel 22, constituted by a peripheral collar, is rotationally guided around axis of revolution 100 with respect to phasing member 15 thanks to three pegs 15.31 that are fastened on annular part 15.3 and slide on three tracks 22.10 configured on oscillating inertial flywheel 22, said tracks also defining limit stops 22.12, 22.13 that limit the angular deflection of oscillating inertial flywheel 22 with respect to phasing member 15. In order to damp torque fluctuations of the phasing member, oscillating inertial flywheel 22 is connected to phasing member 15 by means of three connecting modules 26 arranged at 120° from one another around axis of revolution 100. Each connecting module 26, illustrated in more detail in FIGS. 20 to 24, has an oscillating arm 26.1 pivot-mounted on annular support part 15.3 by means of a pivot 16.2 in order to pivot around a pivot axis 200 parallel to axis of revolution 100, and a rolling body 26.4, in this instance a roller, rolling on a rolling track 26.5 formed on oscillating arm 26.1 and on a rolling track 26.7 formed on oscillating inertial flywheel 22. Rolling track 26.5 formed on oscillating arm 26.1 faces radially outward and toward rolling track 26.7 formed on oscillating inertial flywheel 22, which in turn faces radially inward. The two rolling tracks 26.5, 26.7 are concave in a transverse section perpendicular to axis of revolution 100. Rolling track 26.5 is located between pivot 26.2 and a solid extension 26.9 of the oscillating arm. One part of the oscillating arm also forms an abutment face 26.8. Oppositely to rolling track 26.5 and to solid extension 26.9 with respect to pivot 26.2, the oscillating arm has a heel 26.11 that projects toward secondary inertial flywheel 22 and slides on a curved track 26.12, convex in this case, that resists pivoting of the oscillating arm in a clockwise direction and thus prevents the roller from escaping from the receptacle constituted radially between rolling tracks 26.5 and 26.7, and axially between annular support part 15.3 and a wall 26.13 of oscillating arm 26.1.

Figure 19:
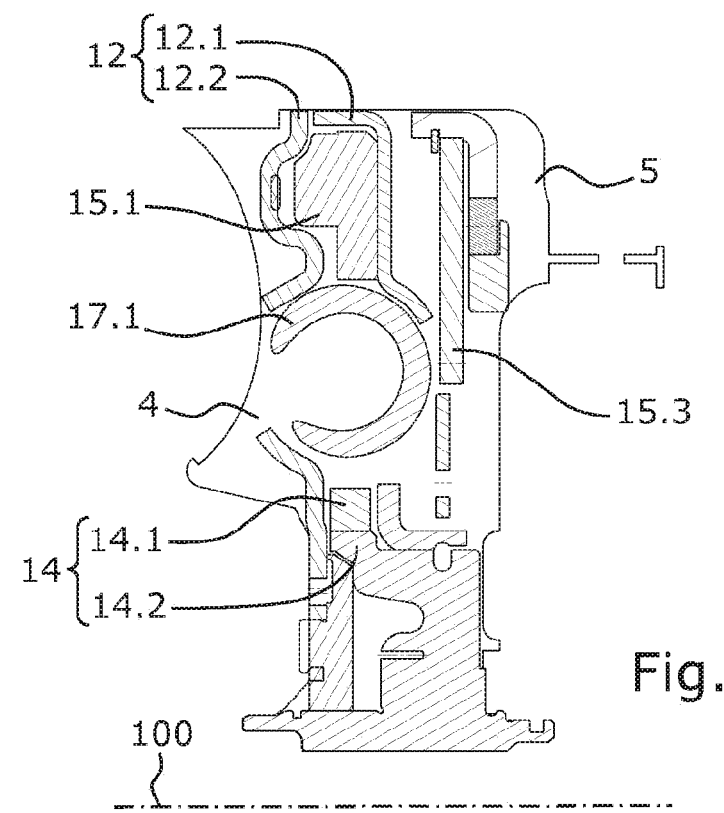
FIG. 19 is an axially sectioned view of the filtering mechanism of FIG. 16 in the section plane XIX of FIG. 17.
Figure 20:
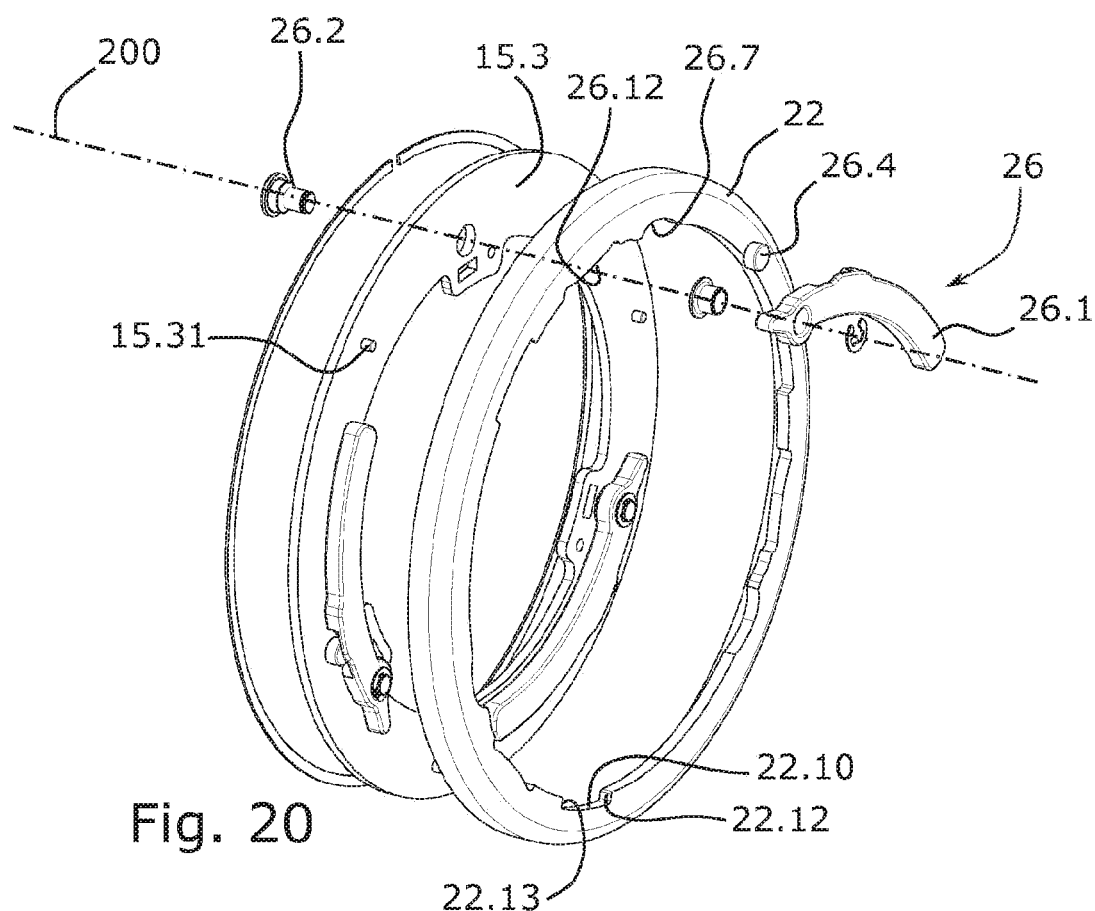
FIG. 20 is an exploded isometric view of a pivot-mounted oscillating mechanism of the filtering mechanism of FIG. 16.
Figure 21:
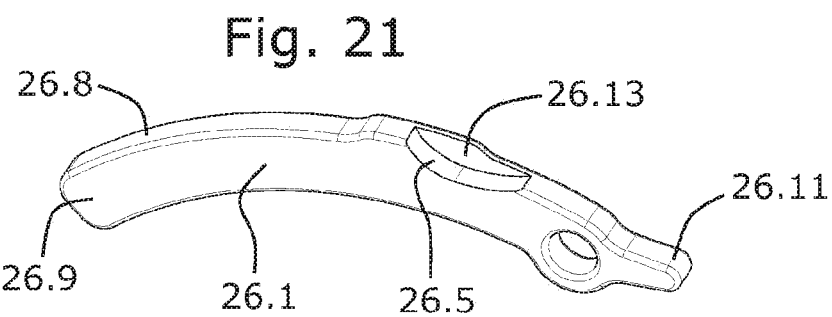
FIG. 21 is an isometric view of an oscillating arm of the pivot-mounted oscillating mechanism of FIG. 20.
Figure 22:
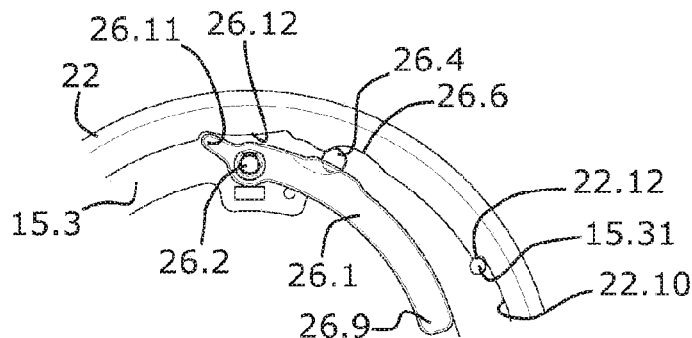
FIG. 22 is a frontal view of a detail of the pivot-mounted oscillating mechanism of FIG. 20 in a first limit position.
Figure 23:
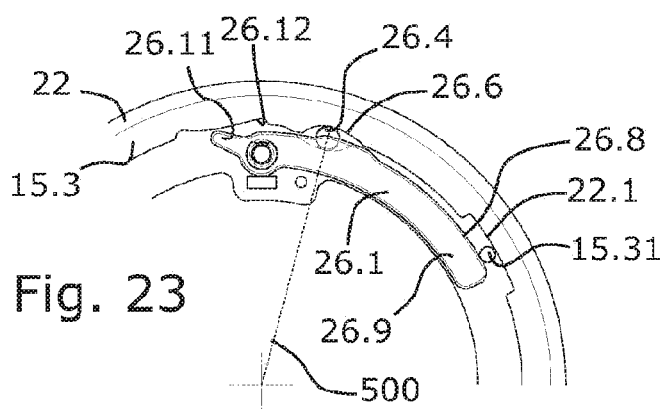
FIG. 23 is a frontal view of a detail of the pivot-mounted oscillating mechanism of FIG. 20 in an intermediate maximum radial deflection position.
Figure 24:
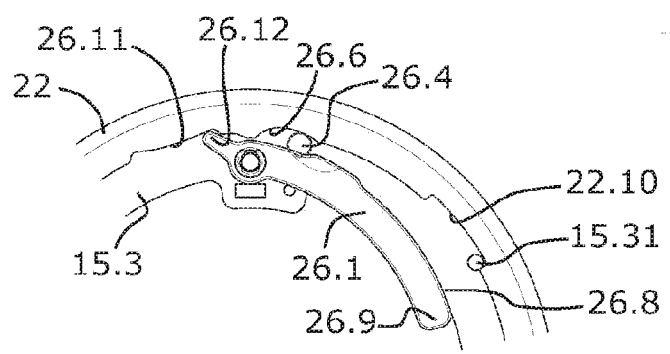
FIG. 24 is a frontal view of a detail of the pivot-mounted oscillating mechanism of FIG. 20 in a second limit position.

The device functions as follows: At rest, at a zero rotation speed, no centrifugal force is exerted on oscillating arms 26.1. Oscillating inertial flywheel 22 can be positioned in a reference angular position with respect to annular support part 15.3 of phasing member 15, as illustrated in FIG. 19. Roller 26.4 of each connecting module 26 is then in a middle position with respect to rolling tracks 26.5, 26.7, and a radial axis 500 can be drawn, in a plane perpendicular to axis of rotation 100, passing through the axis of revolution, through a contact point between the roller and the rolling track formed on the oscillating arm, and through a contact point between roller 26.4 and rolling track 26.5 formed on oscillating inertial flywheel 22, said axis 500 being perpendicular to the two rolling tracks 26.5, 26.7 at the two contact points. This reference position is thus an equilibrium position. From this equilibrium angular position, any relative rotation of oscillating inertial flywheel 22 with respect to phasing member 15 in one direction or the other contributes to bringing solid extension 26.9 of oscillating arms 26.1 closer to the axis of revolution.

When crankshaft 2 is rotating at low speed, the engine torque fluctuations are not effectively filtered by elastic members 16, 17 of filtering mechanism 10. In this speed range, the torque fluctuations at each cylinder ignition are transmitted to phasing member 15 and cause the relative angular positioning of phasing member 15 and of oscillating inertial flywheel 22 to fluctuate with a phase lag. The connecting mechanism constituted by the three pivot-mounted modules 26 allows an angular deflection, on either side of the equilibrium position of FIG. 23, of oscillating inertial flywheel 22 with respect to phasing member 15. Each oscillating arm 26.1, as it rotates with phasing member 15 around axis of revolution 100, applies to roller 26.4, as a result of the centrifugal effect on solid extension 26.9, a force in the direction defined by the two rolling tracks 26.5 and 26.7. When the system is in the equilibrium position, the roller is in the equilibrium position described previously, and the resultant forces at rolling tracks 26.5 and 26.7, which are themselves radial, do not cause a return torque. The effect of the fluctuations in the relative angular positioning of phasing member 15 and oscillating inertial flywheel 22 is to change the angle of the resultant of the forces transmitted by oscillating arm 26.1 to phasing member 15, causing a return torque toward the equilibrium position which increases with the amplitude of the angular deflection and with the square of the rotation speed around the axis of revolution. Pivot-mounted oscillating mechanism 30, constituted by oscillating inertial flywheel 22 connected to phasing member 15 by connecting modules 26, behaves like a filter whose stiffness is variable as a function of speed, resisting torque variations of the member that is constituted by phasing member 15.

When the rotation speed around the axis of revolution increases, the resultant of the centrifugal forces applied by oscillating arm 26.1 to roller 26.4 increases, and the amplitude of the angular deflections between phasing member 15 and oscillating flywheel 24 decreases. The oscillating arm tends to deform elastically, and abutment face 26.8 of the oscillating arm gradually comes closer to oscillating inertial flywheel 22. Above a given critical speed, for example 2200 rpm, abutment face 26.8 of oscillating arm 26.1 comes into contact with peg 15.31, the effect of which is to limit the force on roller 26.4 and on pivot 26.2.

Pivot-mounted oscillating mechanism 30 is intended to damp phasing member 15 in a critical range in which resonance phenomena are observed. As soon as the engine speed is sufficiently high and the natural frequency of pivot-mounted oscillating mechanism 30 has been exceeded, oscillating inertial flywheel 22 oscillates in opposite phase with respect to phasing member 15. Phasing member 15 is thus loaded by counteracting torques that at least partly compensate for one another, namely on the one hand the input and output torques transmitted by springs 16 and 17, and on the other hand an oscillating torque that originates in the inertial flywheel and is transmitted to phasing member 15 via rollers 26.4, oscillating arms 26.1, and pivots 26.2. The moment of inertia of oscillating inertial flywheel 22 is thus selected so that pivot-mounted oscillating mechanism 30 has a very low natural frequency with respect to the torque oscillation frequencies at the intended engine speed.

By combining torque filtering mechanism 10 with pivot-mounted oscillating mechanism 30, the excellent vibration attenuation of phasing member 15 at low speeds is obtained, then pivot-mounted oscillating mechanism 30 is blocked at higher speed, the effect of this blockage of oscillating inertial flywheel 22 being to increase the inertia of phasing member 15. Premature wear on connecting modules 26 is thus avoided.

The profile of first and second rolling tracks 26.5 and 26.6, respectively, can be adapted to each application in order to achieve an adapted response curve.

Figure 25:
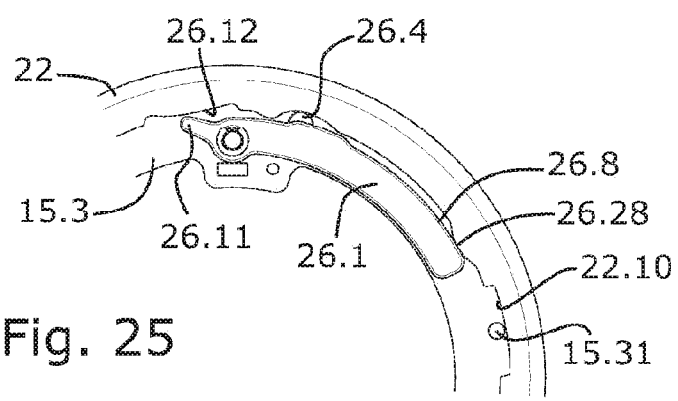
FIG. 25 is a frontal view of a detail of a pivot-mounted oscillating mechanism according to a variant embodiment, in an intermediate maximum radial deflection position.

According to a variant illustrated in FIG. 25, a radial stop 28 that constitutes an abutment for oscillating arm 26.1 in the intermediate maximum deflection position is provided on oscillating inertial flywheel 22. Pivot 26.2 of the oscillating arm is thus configured by coupling oscillating inertial flywheel 22 to phasing member 15 when the rotation speed increases. The inertia of oscillating inertial flywheel 22 is then added to that of phasing member 15. As the rotation speed continues to increase, the forces are distributed among stop 28, pivot 26.2, roller 26.4, and rolling tracks 26.5, 26.6.

The roller-type pivot-mounted connecting modules illustrated more particularly in the embodiments of FIGS. 16 to 25, and the link-type pivot-mounted connecting modules illustrated more particularly in the embodiments of FIGS. 1 to 14, are interchangeable. In other words, the link-type pivot-mounted connecting modules can be used instead of the roller-type pivot-mounted connecting modules in order to implement new variant embodiments of FIGS. 16 to 25, and conversely the roller-type pivot-mounted connecting modules can be used instead of the link-type pivot-mounted connecting modules in order to implement new variant embodiments of FIGS. 1 to 14.

The invention claimed is:

1. A filtering mechanism for torque fluctuations, interposed between a crankshaft of an internal combustion engine rotating around an axis of revolution (100) and a transmission, comprising:
   a primary member (12, 112, 212) rotating around the axis of revolution (100);
   a secondary member (14, 114, 214, 15) rotating around the axis of revolution (100) with respect to the primary member (12, 112, 212), the primary member (12, 112, 212) interposed kinematically between the crankshaft and the secondary member (14, 114, 214);
   an oscillating inertial flywheel (22, 122, 222) rotating around the axis of revolution (100) with respect to the secondary member (14, 114, 214); and
   pivot-mounted connecting modules (26, 126, 226) allowing an angular deflection, on either side of an equilibrium position, of the oscillating inertial flywheel (22, 122, 222) with respect to the secondary member (14, 114, 214);
   the pivot-mounted connecting modules (26, 126, 226) each having at least one oscillating arm (26.1, 226.1) pivoting radially with respect to the secondary member and a kinematic connecting member (26.4, 226.4, 26.40) between the oscillating arm (26.1, 226.1) and the oscillating inertial flywheel (22, 122, 222), positioned so that when the mechanism rotates around the axis of revolution (100), the centrifugal forces on the oscillating arm (26.1, 226.1) produce on the secondary member (14, 114, 214, 15) a counteracting torque that tends to return the oscillating inertial flywheel (22, 122, 222) and the secondary member (14, 114, 214) toward the equilibrium position, the counteracting torque increasing with the rotation speed of the filtering mechanism and with the amplitude of the angular deflection.

2. The filtering mechanism according to claim 1, further comprising a coupling device for coupling the oscillating inertial flywheel to the secondary member when the rotation speed of the mechanism exceeds a predetermined threshold.

3. The filtering mechanism according to claim 1, wherein each oscillating arm (26.1, 226.1) is arranged facing a corresponding stop (28, 228) in order to limit the outward radial motion of each oscillating arm (26.1, 226.1).

4. The filtering mechanism according to claim 3, wherein the stop (28, 228) is integral with the oscillating inertial flywheel (22, 122, 222).

5. The filtering mechanism according to claim 1, further comprising elastic members (16, 116, 216) in order to return the secondary member (14, 114, 214) toward a reference angular position with respect to the primary member (12, 112, 212).

6. The filtering mechanism according to claim 1, wherein one of the primary member (12, 112, 212) and secondary member (14, 114, 214) comprises a web (14.1, 112.1, 214.1), and the other of the primary and secondary members comprises two guide washers (12.1, 12.2, 114.1, 114.2, 212.1, 212.3) fastened to one another and located axially on either side of the web (14.1, 112.1, 214.1).

7. The filtering mechanism according to claim 1, wherein the primary member (12, 112, 212) has an interface (12.4) for fastening to the crankshaft.

8. The filtering mechanism according to claim 1, wherein only one of the primary member (12, 112, 212) and the secondary member (14, 114, 214) is integral with friction surfaces (112.2, 212.2) of a friction clutch (110, 210).

9. The filtering mechanism according to claim 1, wherein the oscillating inertial flywheel (22, 122, 222) is rotationally guided by a bearing (24, 124, 224) installed on only one of the primary member (12, 112, 212), the secondary member (14, 114, 214), a hub (214.3) and a collar, integral with only one of the primary member (12, 112, 212) and the secondary member (14, 114, 214).

10. The filtering mechanism according to claim 1, wherein the secondary member (14, 114, 214) has a connecting interface (114.3, 214.3) to an input shaft (150, 250) of the transmission.

11. The filtering mechanism according to claim 1, wherein the pivot-mounted connecting modules (26, 126, 226) are symmetrical pairwise with respect to the axis of revolution (100) and are symmetrical pairwise with respect to a plane of symmetry containing the axis of revolution (100).

12. The filtering mechanism according to claim 1, wherein the pivot-mounted connecting modules (26, 126, 226) are arranged axially only between the oscillating inertial flywheel (22, 122, 222) and the primary member (12, 112, 212) or between the secondary member (14, 114, 214) and the primary member (12, 112, 212), or inside a receptacle of the primary member (12, 112, 212).

13. The filtering mechanism according to claim 1, wherein the kinematic connecting member (26.4, 26.40) has at least one rolling body (26.4).

14. The filtering mechanism according to claim 13, wherein the oscillating arm (26.1) pivots around a pivot axis (200) with respect to the secondary member (15, 114), the at least one rolling body (26.4) has a rotation axis parallel to the pivot axis (200).

15. The filtering mechanism according to claim 13, wherein the at least one rolling body (26.4) rolls on a first rolling track (26.5) formed on the oscillating arm (26.1) and on a second rolling track (26.6) formed on the oscillating inertial flywheel (22).

16. The filtering mechanism according to claim 1, wherein the kinematic connecting member has a connecting link (26.4, 226.4) between the oscillating arm (26.1, 226.1) and the oscillating inertial flywheel (22, 122, 222).

17. The filtering mechanism according to claim 4, wherein the kinematic connecting member is a connecting link (26.4, 226.4) between the oscillating arm (26.1, 226.1) and the oscillating inertial flywheel (22, 122, 222), wherein the oscillating arm (26.1, 226.1) pivots with respect to the secondary member (14, 114, 214) around a first pivot axis (26.3, 226.3), wherein the link (26.4, 226.4) pivots around the oscillating arm (26.1, 226.1) around a second pivot axis (26.6, 226.6) and with respect to the oscillating inertial flywheel (22, 122, 222) around a third pivot axis (26.8, 226.8), wherein the first, second and third pivot axes are arranged in such a way that at rest, the distance between the oscillating arm (26.1, 226.1) and the corresponding stop (28, 228) passes through a non-zero minimum when the second pivot axis (26.6, 226.6), the third pivot axis (26.8, 226.8) and the axis of revolution (100) are positioned in one radial plane.

18. A mechanical assemblage having a filtering mechanism according to claim 1 and only one of a single and dual friction clutch (29, 112, 212) having a friction surface ((112.2, 212.2) integral with only one of the primary member and the secondary member.

19. The mechanical assemblage according to claim 18, wherein the friction surface is located axially at a distance from the secondary member and is coupled to the secondary member by means of a connecting part.

20. The mechanical assemblage according to claim 18, wherein the filtering mechanism is interposed between the crankshaft and the friction clutch (29).

21. A filtering mechanism for torque fluctuations, interposed between a crankshaft of an internal combustion engine rotating around an axis of revolution and a transmission, comprising:
    a primary member rotating around the axis of revolution;
    a secondary member rotating around the axis of revolution with respect to the primary member, the primary member interposed kinematically between the crankshaft and the secondary member;
    an intermediate phasing member interposed between the primary member and the secondary member;
    an oscillating inertial flywheel rotating around the axis of revolution with respect to the secondary member; and
    pivot-mounted connecting modules rotatably connecting the oscillating inertial flywheel to the intermediate phasing member;
    the intermediate phasing member connected to the primary member via a first elastic member and to the secondary member via a second elastic member.

22. The filtering mechanism according to claim 21, wherein each of the pivot-mounted connecting modules has at least one oscillating arm pivoting radially with respect to the intermediate phasing member and the oscillating inertial flywheel, and wherein the at least one oscillating arm is positioned so that when the filtering mechanism rotates around the axis of revolution, the centrifugal forces on the at least one oscillating arm produce on the intermediate phasing member a counteracting torque that at least partly compensate the input and output torques transmitted by the first and second elastic members, and an oscillating torque that originates in the oscillating inertial flywheel and is transmitted to the intermediate phasing member via the at least one oscillating arm.

23. The filtering mechanism according to claim 21, wherein the first elastic member has a stiffness K1, and wherein the second elastic member has a stiffness K2 different from the stiffness K1.

24. A hydrokinetic torque converter including a filtering mechanism for torque fluctuations, interposed between a crankshaft of an internal combustion engine rotating around an axis of revolution and a transmission, the filtering mechanism comprising:
- a primary member rotating around the axis of revolution;
- a secondary member rotating around the axis of revolution with respect to the primary member, the primary member interposed kinematically between the crankshaft and the secondary member;
- an intermediate phasing member interposed between the primary member and the secondary member;
- an oscillating inertial flywheel rotating around the axis of revolution with respect to the secondary member; and
- pivot-mounted connecting modules rotatably connecting the oscillating inertial flywheel to the intermediate phasing member;
- the intermediate phasing member connected to the primary member via a first elastic member and to the secondary member via a second elastic member.

* * * * *